US012681245B2

(12) United States Patent
Zhang et al.

(10) Patent No.: US 12,681,245 B2
(45) Date of Patent: Jul. 14, 2026

(54) DIRECT SILICON-TO-SILICON BONDING FOR FIBER-FIRST PACKAGING PROCESS

(71) Applicant: Ayar Labs, Inc., Santa Clara, CA (US)

(72) Inventors: Chong Zhang, San Jose, CA (US);
Haiwei Lu, Santa Clara, CA (US);
Steve Groothuis, Santa Clara, CA (US)

(73) Assignee: Ayar Labs, Inc., San Jose, CA (US)

( * ) Notice: Subject to any disclaimer, the term of this patent is extended or adjusted under 35 U.S.C. 154(b) by 240 days.

(21) Appl. No.: 18/486,088

(22) Filed: Oct. 12, 2023

(65) Prior Publication Data

US 2025/0044534 A1     Feb. 6, 2025

Related U.S. Application Data

(60) Provisional application No. 63/516,834, filed on Jul. 31, 2023.

(51) Int. Cl.
*G02B 6/42* (2006.01)

(52) U.S. Cl.
CPC ......... *G02B 6/4245* (2013.01); *G02B 6/4239* (2013.01)

(58) Field of Classification Search
None
See application file for complete search history.

(56) References Cited

U.S. PATENT DOCUMENTS

| | | | |
|---|---|---|---|
| 5,361,382 A | 11/1994 | Nakamura et al. | |
| 11,495,569 B2 * | 11/2022 | Hu | H01L 24/08 |
| 11,670,627 B1 * | 6/2023 | Alapati | H01L 21/4853 |
| | | | 257/432 |
| 12,094,849 B2 * | 9/2024 | Cheng | H01L 24/82 |
| 2003/0091264 A1 * | 5/2003 | Kimerling | G02B 6/4201 |
| | | | 385/14 |
| 2014/0029888 A1 * | 1/2014 | La Porta | G02B 6/42 |
| | | | 385/2 |
| 2015/0355424 A1 | 12/2015 | Zhou et al. | |
| 2019/0369339 A1 | 12/2019 | Knickerbocker et al. | |
| 2020/0075539 A1 * | 3/2020 | Luo | H01L 23/31 |
| 2021/0098419 A1 | 4/2021 | Saleh et al. | |
| 2021/0109284 A1 | 4/2021 | Meade et al. | |
| 2021/0132309 A1 | 5/2021 | Zhang et al. | |
| 2021/0233901 A1 * | 7/2021 | Or-Bach | H01L 21/7806 |
| 2021/0257288 A1 * | 8/2021 | Meade | H01L 23/3185 |
| 2023/0161120 A1 | 5/2023 | Yu et al. | |
| 2023/0204879 A1 | 6/2023 | Kim et al. | |

OTHER PUBLICATIONS

PCT Patent Application No. PCT/US2024/034522, International Search Report and Written Opinion of the International Searching Authority, Mailed on Aug. 26, 2024, 21 pages.

* cited by examiner

*Primary Examiner* — Jerry Rahll

(74) *Attorney, Agent, or Firm* — Penilla IP, APC

(57) ABSTRACT

An electro-optical chip assembly includes a silicon baseplate and an electro-optical chip. The electro-optical chip has a silicon substrate that is fusion bonded to the silicon baseplate. The electro-optical chip is manufactured separate from the silicon baseplate before fusion bonding of the silicon substrate of the electro-optical chip to the silicon baseplate.

22 Claims, 18 Drawing Sheets

(View A-A)

(View B-B)

(View C-C)

(View D-D)

(View A-A)

(View B-B)

(View A-A)

(View A-A)

(View A-A)

(View A-A)

(View B-B)

601

603

603    603    603

A    603    603    603    A 603    603    603

603

(View A-A)

601

603
103

603
103

603
103

603
103

603
103

603
103

603
103

603
103

603
103

603
103

603
103

A

A 103    104    109
601
603
105

103    103    103    601
603    603    603

(View A-A)

(View A-A)

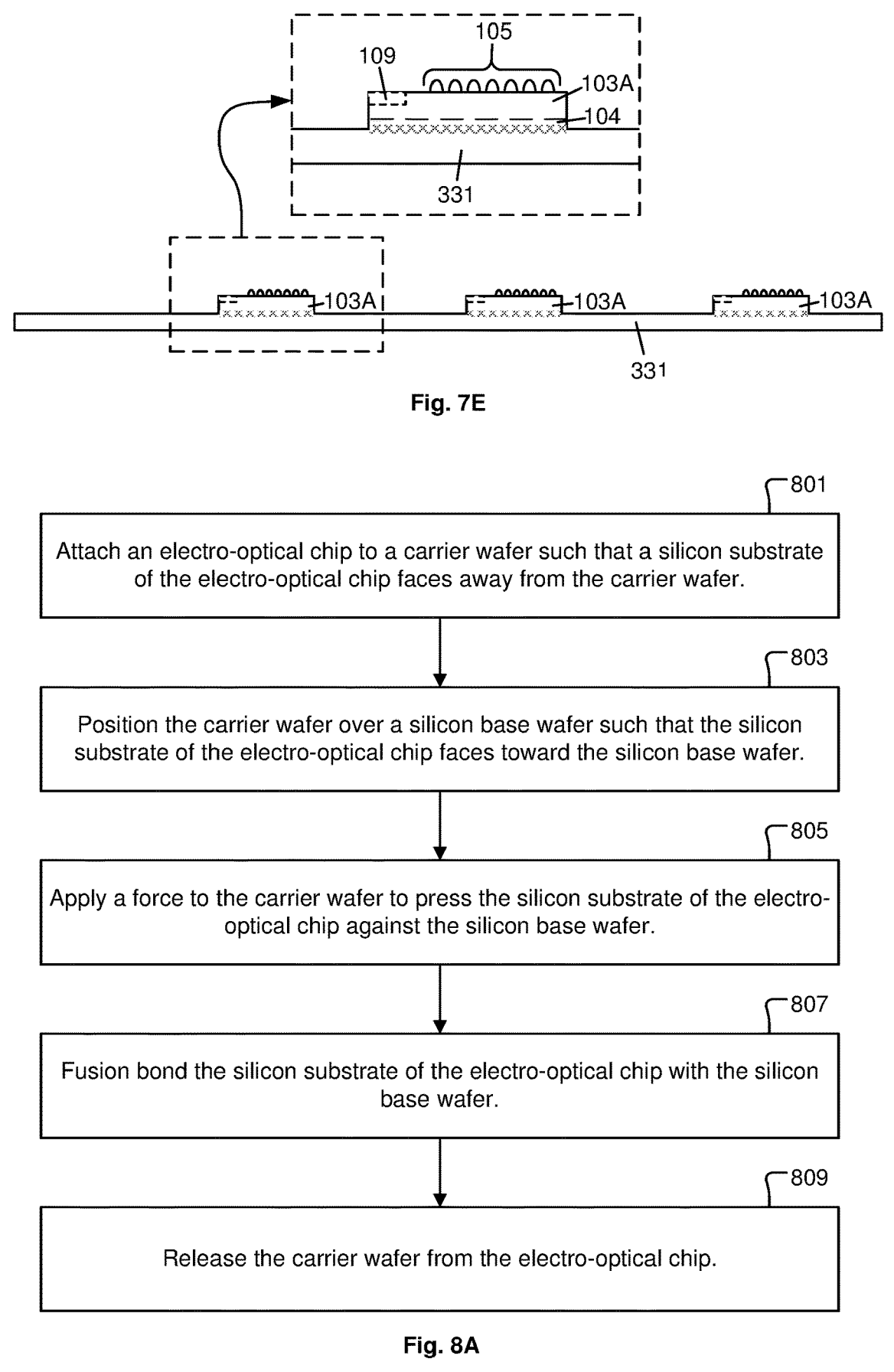

Attach an electro-optical chip to a carrier wafer such that a silicon substrate of the electro-optical chip faces away from the carrier wafer.

803

Position the carrier wafer over a silicon base wafer such that the silicon substrate of the electro-optical chip faces toward the silicon base wafer.

805

Apply a force to the carrier wafer to press the silicon substrate of the electro-optical chip against the silicon base wafer.

807

Fusion bond the silicon substrate of the electro-optical chip with the silicon base wafer.

809

Release the carrier wafer from the electro-optical chip.

Fig. 8A

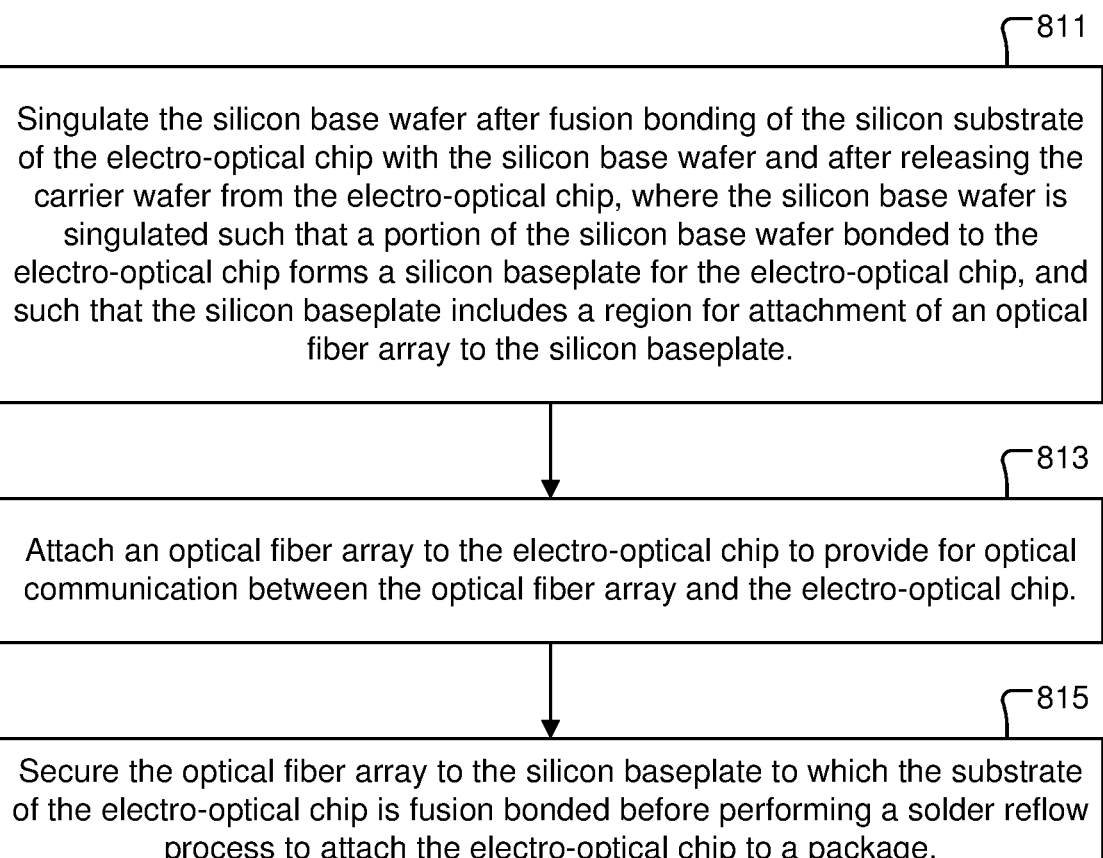

811

Singulate the silicon base wafer after fusion bonding of the silicon substrate of the electro-optical chip with the silicon base wafer and after releasing the carrier wafer from the electro-optical chip, where the silicon base wafer is singulated such that a portion of the silicon base wafer bonded to the electro-optical chip forms a silicon baseplate for the electro-optical chip, and such that the silicon baseplate includes a region for attachment of an optical fiber array to the silicon baseplate.

813

Attach an optical fiber array to the electro-optical chip to provide for optical communication between the optical fiber array and the electro-optical chip.

815

Secure the optical fiber array to the silicon baseplate to which the substrate of the electro-optical chip is fusion bonded before performing a solder reflow process to attach the electro-optical chip to a package.

Fig. 8B

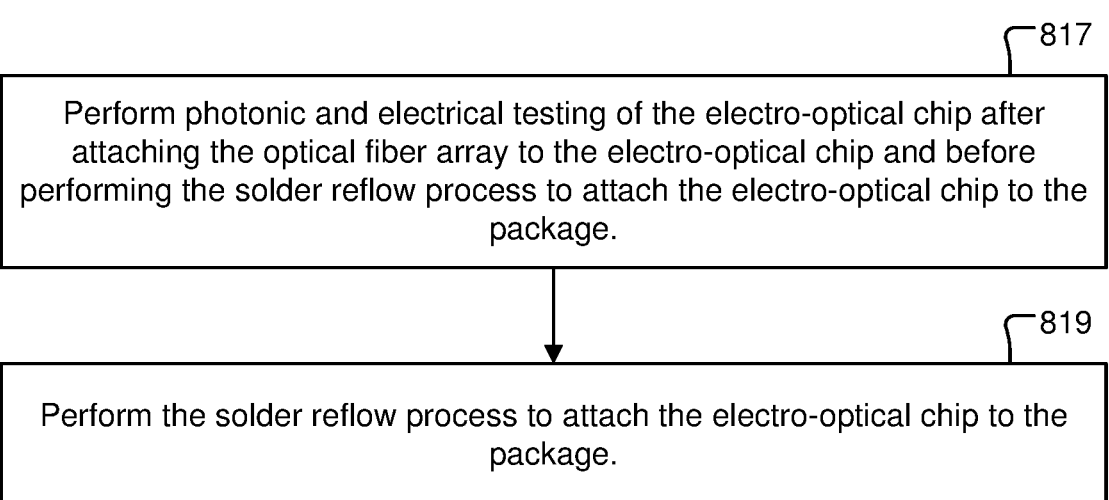

817

Perform photonic and electrical testing of the electro-optical chip after attaching the optical fiber array to the electro-optical chip and before performing the solder reflow process to attach the electro-optical chip to the package.

819

Perform the solder reflow process to attach the electro-optical chip to the package.

Fig. 8C

DIRECT SILICON-TO-SILICON BONDING FOR FIBER-FIRST PACKAGING PROCESS

CROSS-REFERENCE TO RELATED APPLICATIONS

This claims priority under 35 U.S.C. 119 (e) to U.S. Provisional Patent Application No. 63/516,834, filed on Jul. 31, 2023, the disclosure of which is incorporated herein by reference in its entirety for all purposes.

BACKGROUND OF THE INVENTION

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. The transmission of light through the optical data network includes transmission of light through optical fibers and transmission of light between optical fibers and photonic integrated circuits within electro-optical semiconductor chips. Therefore, implementation and operation of optical data communication systems is dependent upon having reliable and efficient solutions for optically connecting optical fibers to electro-optical semiconductor chips. Additionally, because the electro-optical chip is often implemented in physical connection with another component, it is of interest to test the electrical and photonic operation of the electro-optical chip before physically connecting it to the other component, lest an inoperable electro-optical chip incur the loss of itself and the other component. It is within this context that the present disclosed embodiments arise.

SUMMARY OF THE INVENTION

In an example embodiment, an electro-optical chip assembly is disclosed. The electro-optical chip assembly includes a silicon baseplate and an electro-optical chip. The electro-optical chip has a silicon substrate that is fusion bonded to the silicon baseplate. The electro-optical chip is manufactured separate from the silicon baseplate before fusion bonding of the silicon substrate of the electro-optical chip to the silicon baseplate.

In an example embodiment, an electro-optical chip wafer assembly is disclosed. The electro-optical chip wafer assembly includes a silicon base wafer and a plurality of electro-optical chips distributed across the silicon base wafer. Each of the plurality of electro-optical chips has a silicon substrate fusion bonded to the silicon base wafer. Each of the plurality of electro-optical chips is manufactured on a semiconductor wafer that is separate from the silicon base wafer.

In an example embodiment, a method is disclosed for manufacturing an electro-optical chip assembly. The method includes attaching an electro-optical chip to a carrier wafer such that a silicon substrate of the electro-optical chip faces away from the carrier wafer. The method also includes positioning the carrier wafer over a silicon base wafer such that the silicon substrate of the electro-optical chip faces toward the silicon base wafer. The method also includes applying a force to the carrier wafer to press the silicon substrate of the electro-optical chip against the silicon base wafer. The method also includes fusion bonding the silicon substrate of the electro-optical chip with the silicon base wafer. The method also includes releasing the carrier wafer from the electro-optical chip.

BRIEF DESCRIPTION OF THE DRAWINGS

FIG. 7E shows a vertical cross-section view through the silicon base wafer with the plurality of solder bumps disposed on each of the electro-optical chips, in accordance with some embodiments.

FIG. 8A shows a flowchart of a method for manufacturing the electro-optical chip assembly, in accordance with some embodiments.

FIG. 8B shows a flowchart of a continuation of the method for manufacturing the electro-optical chip assembly as shown in the flowchart of FIG. 8A, in accordance with some embodiments.

FIG. 8C shows a flowchart of a continuation of the method for manufacturing the electro-optical chip assembly as shown in the flowchart of FIG. 8B, in accordance with some embodiments.

DETAILED DESCRIPTION OF THE INVENTION

In the following description, numerous specific details are set forth in order to provide an understanding of the embodiments disclosed herein. It will be apparent, however, to one skilled in the art that the embodiments disclosed herein may be practiced without some or all of these specific details. In other instances, well known process operations have not been described in detail in order not to unnecessarily obscure the disclosed embodiments.

Figure 1A:
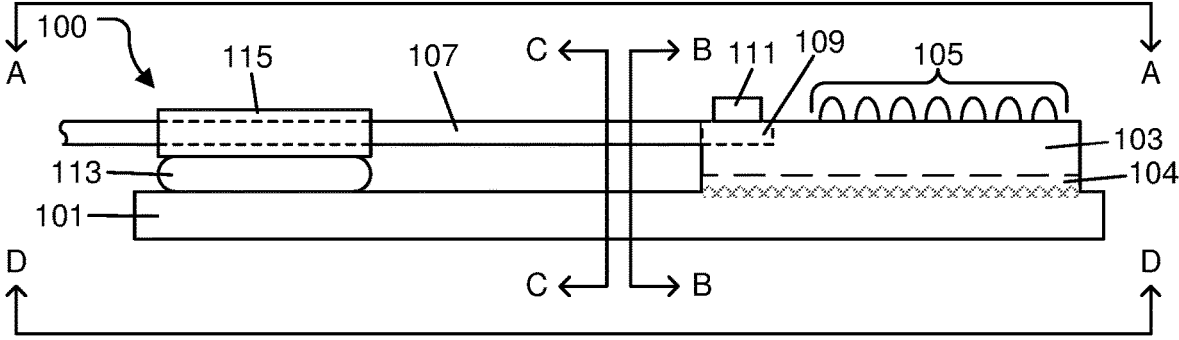
FIG. 1A shows a side view of an electro-optical chip assembly, in accordance with some embodiments.

FIG. 1A shows a side view of an electro-optical chip assembly 100, in accordance with some embodiments. The electro-optical chip assembly 100 includes a silicon baseplate 101 and an electro-optical chip 103. The electro-optical chip 103 has a silicon substrate 104. The silicon substrate 104 of the electro-optical chip 103 is fusion bonded to the silicon baseplate 101. The electro-optical chip 103 is manufactured separate from the silicon baseplate 101 before fusion bonding of the silicon substrate 104 of the electro-optical chip 103 to the silicon baseplate 101. A plurality of optical fibers 107 is attached to the electro-optical chip 103. More specifically, the plurality of optical fibers 107 is secured within an optical fiber attachment region 109 of the electro-optical chip 103, such that each of the plurality of optical fibers 107 is optically coupled with a corresponding optical device, e.g., spot size converter, optical waveguide, optical edge coupler, optical grating coupler, among others, within the electro-optical chip 103. In some embodiments, an adhesive, e.g., optical index matched epoxy, is disposed to secure the plurality of optical fibers 107 within the optical fiber attachment region 109 of the electro-optical chip 103. In some embodiments, a cover plate 111 is disposed to secure the plurality of optical fibers 107 within the optical fiber attachment region 109 of the electro-optical chip 103. The plurality of optical fibers 107 is also secured to the silicon baseplate 101. In some embodiments, an adhesive 113, e.g., epoxy, is disposed to secure the plurality of optical fibers 107 to the silicon baseplate 103. In some embodiments, the plurality of optical fibers 107 are attached to a support block 115, where the support block 115 is secured to the silicon baseplate 101 by the adhesive 113. In some embodiments, such as shown in FIG. 1A, the plurality of optical fibers 107 pass through the support block 115. In various embodiments, the support block 115 is formed of one or more of glass, metal, plastic, and/or ceramic, among other materials.

The electro-optical chip 103 also includes a plurality of solder bumps 105, e.g., a solder ball grid array (BGA), disposed on a surface of the electro-optical chip 103 that faces away from the silicon baseplate 101. It should be understood and appreciated that the plurality of optical fibers 107 is secured to the electro-optical chip 103 and to the silicon baseplate 101 when the electro-optical chip 103 is in a pre-solder-reflow state, where the pre-solder-reflow state includes the electro-optical chip 103 having the plurality of solder bumps 105 exposed on the surface of the electro-optical chip 103 that faces away from the silicon baseplate 101. In this manner, the plurality of optical fibers 107 is secured to the electro-optical chip 103 after the silicon substrate 104 of the electro-optical chip 103 is fusion bonded to the silicon baseplate 101, and before the electro-optical chip 103 is flip-chip attached to another electronic package component or to another computer chip or to a printed circuit board or the like.

Figure 1B:
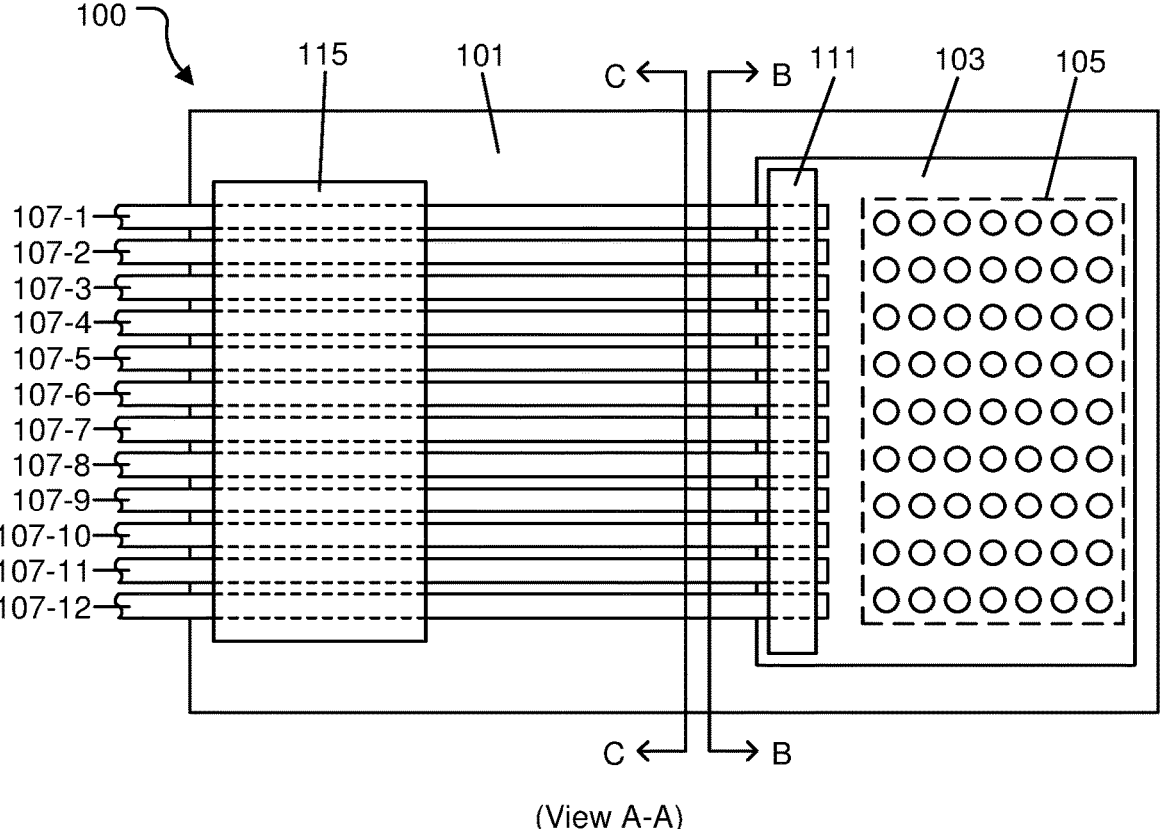
FIG. 1B shows a top view of the electro-optical chip assembly, referenced as View A-A in FIG. 1A, in accordance with some embodiments.

FIG. 1B shows a top view of the electro-optical chip assembly 100, referenced as View A-A in FIG. 1A, in accordance with some embodiments. In the example electro-optical chip assembly 100, the plurality of optical fibers 107 includes twelve optical fibers 107-1 to 107-12. It should be understood, however, that in various embodiments, the electro-optical chip assembly 100 can include more or less than the twelve optical fibers 107-1 to 107-12. Also, while the example electro-optical chip assembly 100 shows the plurality of optical fibers 107 arranged in one row across the electro-optical chip 103, it should be understood that in other embodiments, the plurality of optical fibers 107 can be arranged in multiple rows across the electro-optical chip 103, e.g., in multiple vertically stacked rows along a given edge of the electro-optical chip 103 and/or along multiple edges of the electro-optical chip 103. In some embodiments, the cover plate 111 extends over all of the plurality of optical fibers 107 along a given edge of the electro-optical chip 103 and is secured to the electro-optical chip 103. In some embodiments, the cover plate 111 is secured to the electro-optical chip 103 by an adhesive, e.g., epoxy. In some embodiments, the cover plate 111 is secured to the electro-optical chip 103 through soldered attachments. However, it should be understood that in various embodiments the cover plate 111 can be secured to the electro-optical chip 103 though essentially any means, such as gluing, soldering, brazing, mechanical fastening, friction fitting, among others, so long as the cover plate 111 functions to assist with holding and/or protecting the plurality of optical fibers 107 within the optical fiber attachment region 109 of the electro-optical chip 103.

FIG. 1B also shows the plurality of solder bumps 105 as a number of circular structures distributed as a BGA within a region delineated by a dashed line. For ease of description and to avoid unnecessarily obscuring the figures, the dashed line that surrounds the plurality of solder bumps 105 is referenced as the plurality of solder bumps 105. However, it should be understood that the circular shapes shown within the region delineated by the dashed line actually represent the plurality of solder bumps 105. Also, it should be understood that the particular BGA size and arrangement for the plurality of solder bumps 105 as shown for the example electro-optical chip 103 is provided by way of example. In various embodiments, the electro-optical chip 103 can have essentially any number and arrangement of the plurality of solder bumps 105.

Figures 1C, 1D:
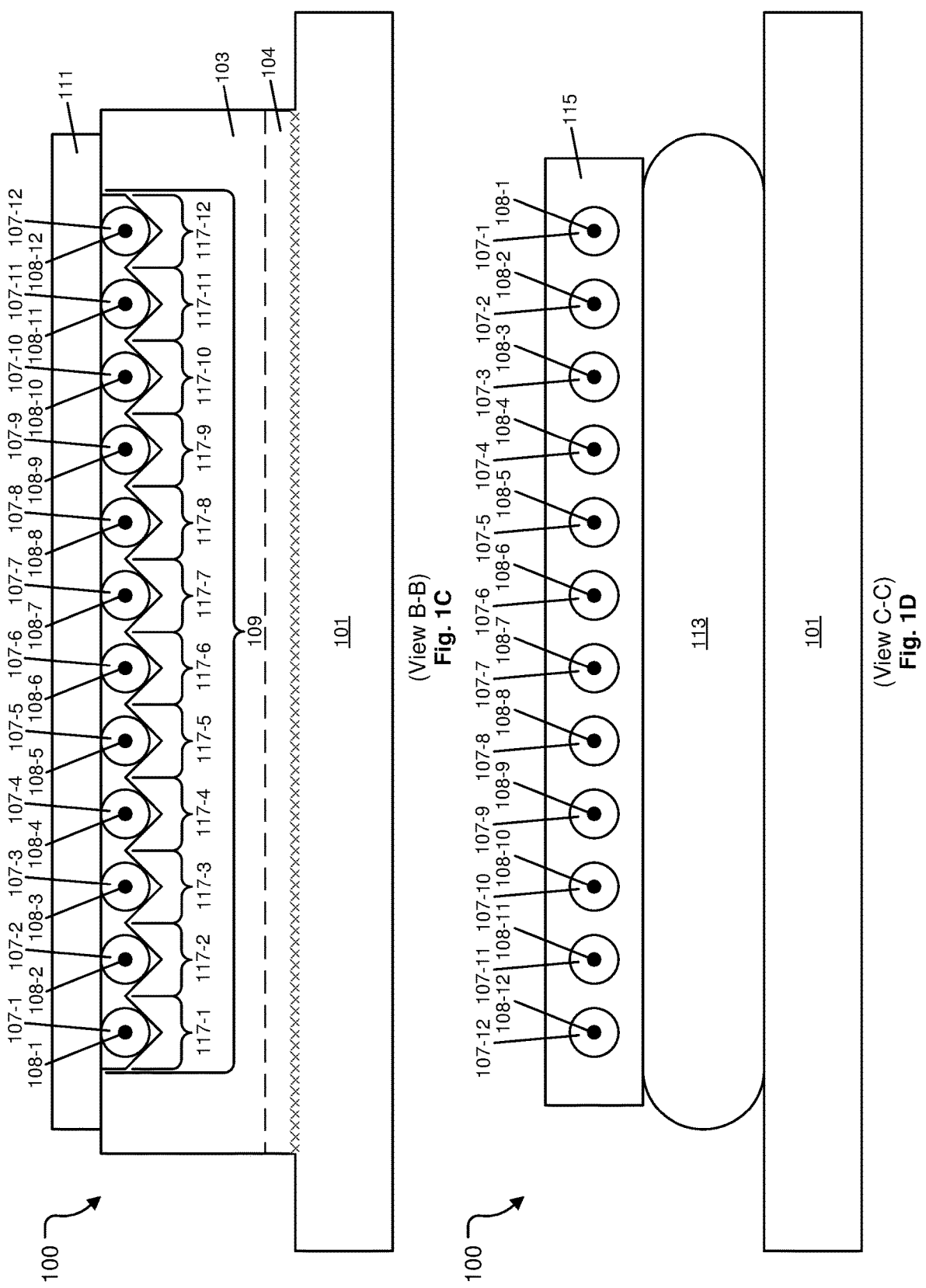
FIG. 1C shows a vertical cross-section view through the electro-optical chip assembly facing toward the electro-optical chip, referenced as View B-B in FIGS. 1A and 1B, in accordance with some embodiments.
FIG. 1D shows a vertical cross-section view through the electro-optical chip assembly facing toward the support block, referenced as View C-C in FIGS. 1A and 1B, in accordance with some embodiments.

FIG. 1C shows a vertical cross-section view through the electro-optical chip assembly 100 facing toward the electro-optical chip 103, referenced as View B-B in FIGS. 1A and 1B, in accordance with some embodiments. In some embodiments, the optical fiber attachment region 109 of the electro-optical chip 103 includes a plurality of optical alignment structures 117-1 to 117-12 corresponding to the plurality of optical fibers 107-1 to 107-12, respectively. In the example electro-optical chip 103, each of the plurality of optical alignment structures 117-1 to 117-12 is a v-groove structure configured to receive and align respective optical cores 108-1 to 108-12 of the plurality of optical fibers 107-1 to 107-12 with respective optical devices within the electro-optical chip 103. For example, FIG. 1C shows the plurality of optical fibers 107-1 to 107-12 respectively disposed within the v-grooves that form the plurality of optical alignment structures 117-1 to 117-12. The cover plate 111 is disposed to hold the plurality of optical fibers 107-1 to 107-12 within the v-grooves of the plurality of optical alignment structures 117-1 to 117-12.

Figure 1E:
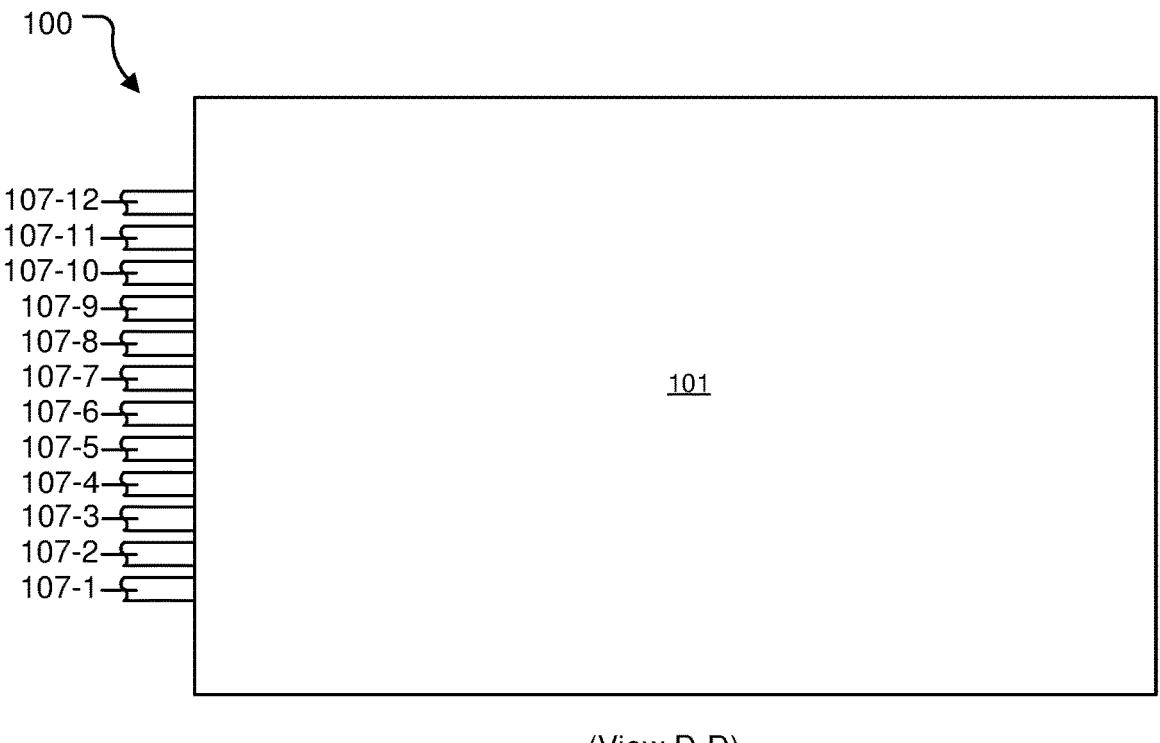
FIG. 1E shows a bottom view of the electro-optical chip assembly, referenced as View D-D in FIG. 1A, in accordance with some embodiments.

FIG. 1D shows a vertical cross-section view through the electro-optical chip assembly 100 facing toward the support block 115, referenced as View C-C in FIGS. 1A and 1B, in accordance with some embodiments. FIG. 1E shows a bottom view of the electro-optical chip assembly 100, referenced as View D-D in FIG. 1A, in accordance with some embodiments.

Figure 2A:
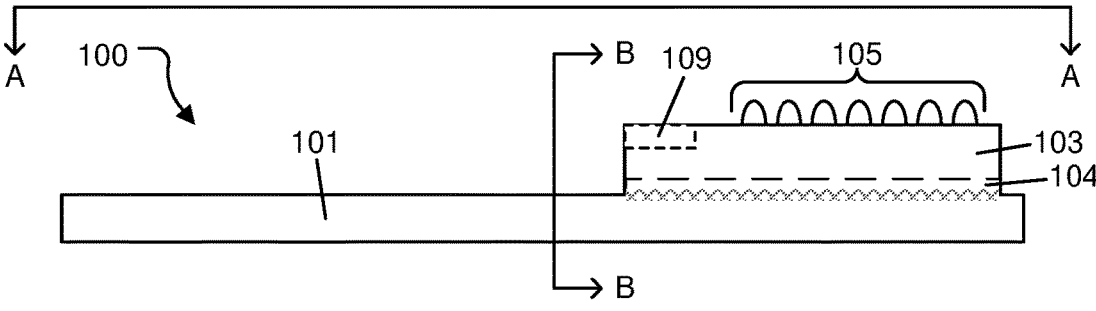
FIG. 2A shows a side view of the electro-optical chip assembly before attachment of the plurality of optical fibers, in accordance with some embodiments.
Figure 2B:
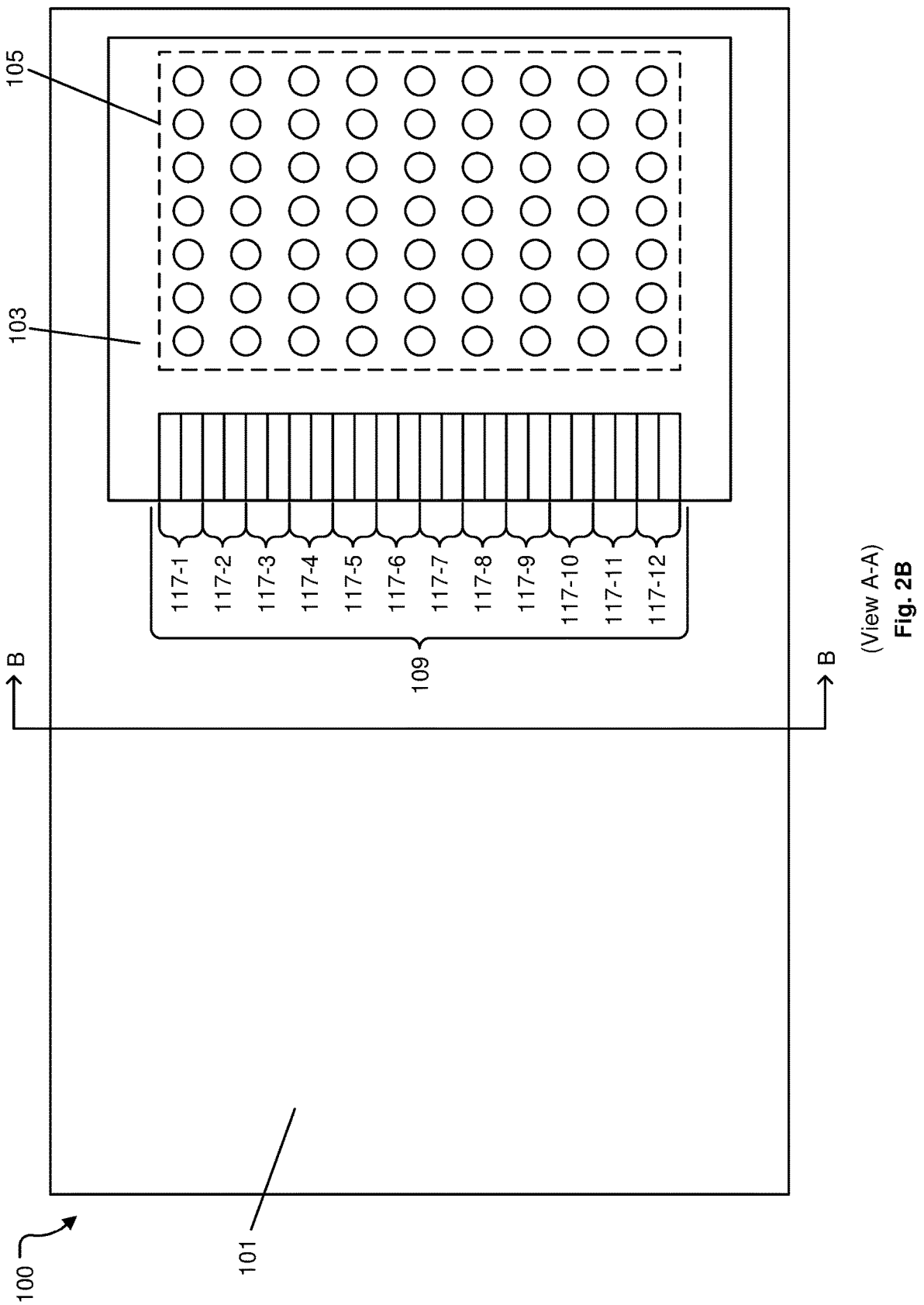
FIG. 2B shows a top view of the electro-optical chip assembly before attachment of the plurality of optical fibers, referenced as View A-A in FIG. 2A, in accordance with some embodiments.
Figure 2C:
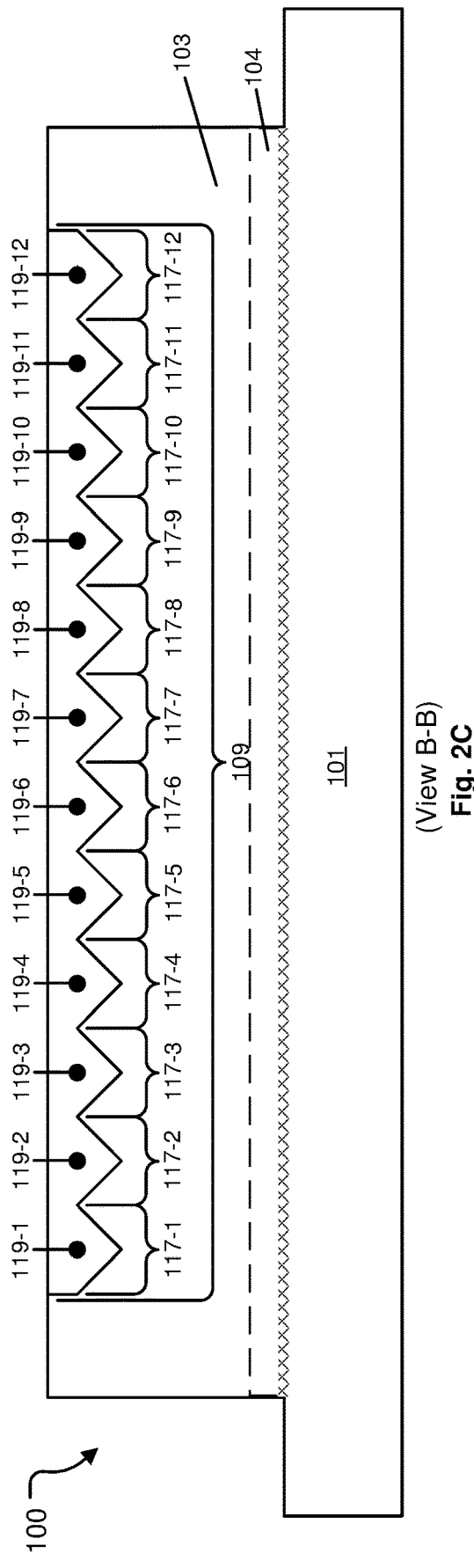
FIG. 2C shows a vertical cross-section view through the electro-optical chip assembly facing toward the electro-optical chip before attachment of the plurality of optical fibers, referenced as View B-B in FIGS. 2A and 2B, in accordance with some embodiments.

FIG. 2A shows a side view of the electro-optical chip assembly 100 before attachment of the plurality of optical fibers 107, in accordance with some embodiments. FIG. 2B shows a top view of the electro-optical chip assembly 100 before attachment of the plurality of optical fibers 107, referenced as View A-A in FIG. 2A, in accordance with some embodiments. FIG. 2C shows a vertical cross-section view through the electro-optical chip assembly 100 facing toward the electro-optical chip 103 before attachment of the plurality of optical fibers 107, referenced as View B-B in FIGS. 2A and 2B, in accordance with some embodiments.

Figures 3A, 3B:
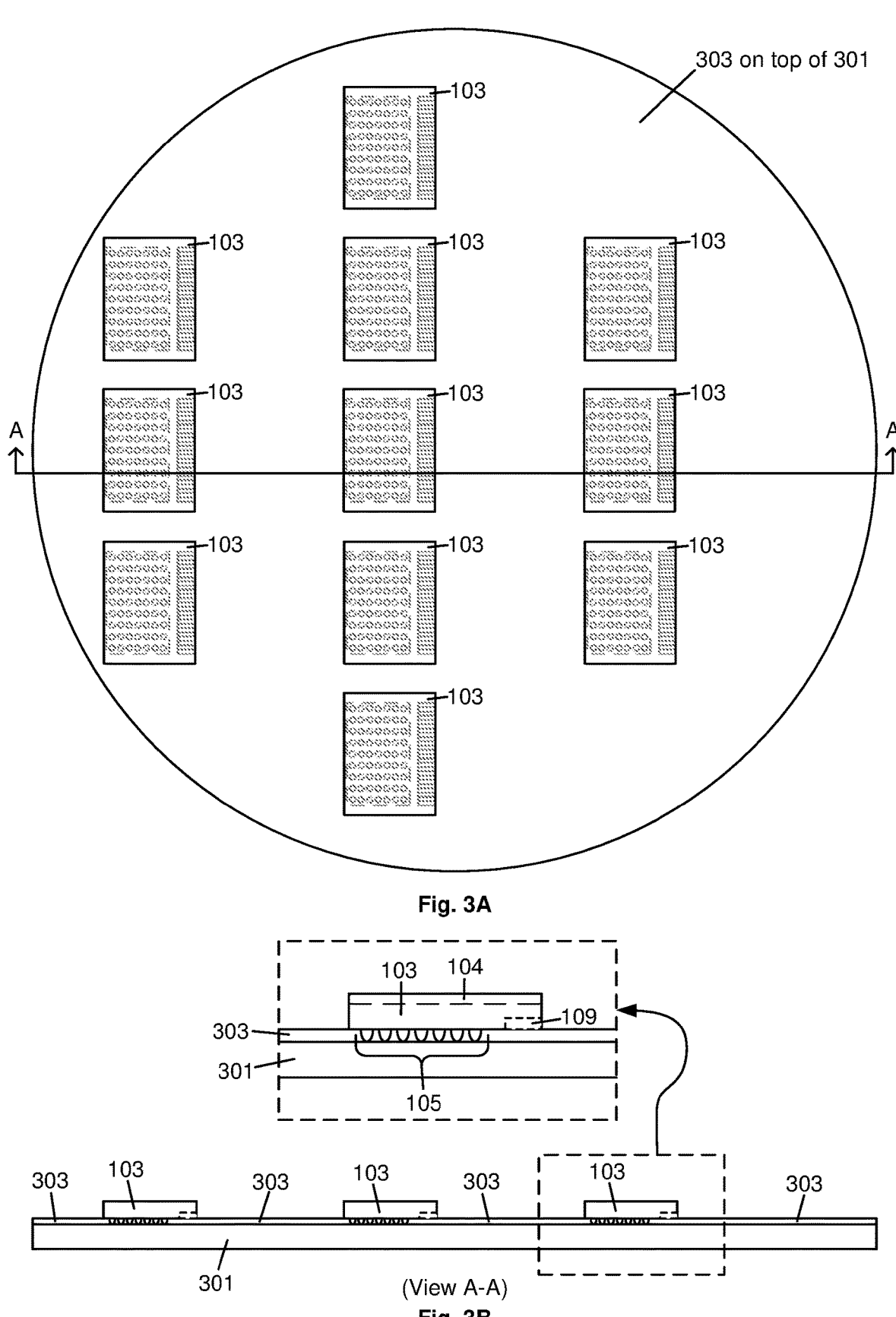
FIG. 3A shows a top view of a carrier wafer having an adhesive layer disposed over the carrier wafer, in accordance with some embodiments.
FIG. 3B shows a vertical cross-section view through the carrier wafer, referenced as View A-A in FIG. 3A, in accordance with some embodiments.

FIGS. 3A through 3J show various stages of a process for manufacturing the electro-optical chip assembly 100, in accordance with various embodiments. FIG. 3A shows a top view of a carrier wafer 301 having an adhesive layer 303 disposed over the carrier wafer 301, in accordance with some embodiments. A number of the electro-optical chips 103 are disposed on the adhesive layer 303 across the carrier wafer 301. In various embodiments, the adhesive layer 303 is a temporary bonding material that is configured to hold the electro-optical chips 103 on the carrier wafer 301 until a desired time for release of the electro-optical chips 103 from the carrier wafer 301. FIG. 3B shows a vertical cross-section view through the carrier wafer 301, referenced as View A-A in FIG. 3A, in accordance with some embodiments. In this example embodiment, the plurality of solder bumps 105 are disposed on each of the electro-optical chips 103 before the electro-optical chips 103 are disposed on the adhesive layer 303 on the carrier wafer 301. Also, it should be understood that each of the electro-optical chips 103 is disposed on the adhesive layer 303 with its corresponding plurality of solder bumps 105 facing toward the carrier wafer 301 and with its corresponding substrate 104 facing away from the carrier wafer 301. In some embodiments, the adhesive layer 303 is configured to substantially surround the plurality of solder bumps 105 on each of the electro-optical chips 103, with the plurality of solder bumps 105 in contact with the top surface of the carrier wafer 301. In some embodiments, the adhesive layer 303 is configured to substantially surround the plurality of solder bumps 105 on each of the electro-optical chips 103, with the plurality of solder bumps 105 separated from the top surface of the carrier wafer 301 by a portion of the adhesive layer 303. It should be understood that the electro-optical chips 103 are disposed on the adhesive layer 303 across the carrier wafer 301 such that the bottom surfaces of the electro-optical chips 103 (the silicon substrate 104 surfaces of the electro-optical chips 103) are substantially coplanar with each other across the carrier wafer 301. Also, it should be appreciated that each electro-optical chip 103 is positioned on the carrier wafer 301 such that an open region is present next to the optical fiber attachment region 109 of the electro-optical chip 103, where the open region corresponds to an area in which the silicon baseplate 101 corresponding to the electro-optical chip 103 is to be formed to create the electro-optical chip assembly 100.

Figures 3C, 3D, 3E:
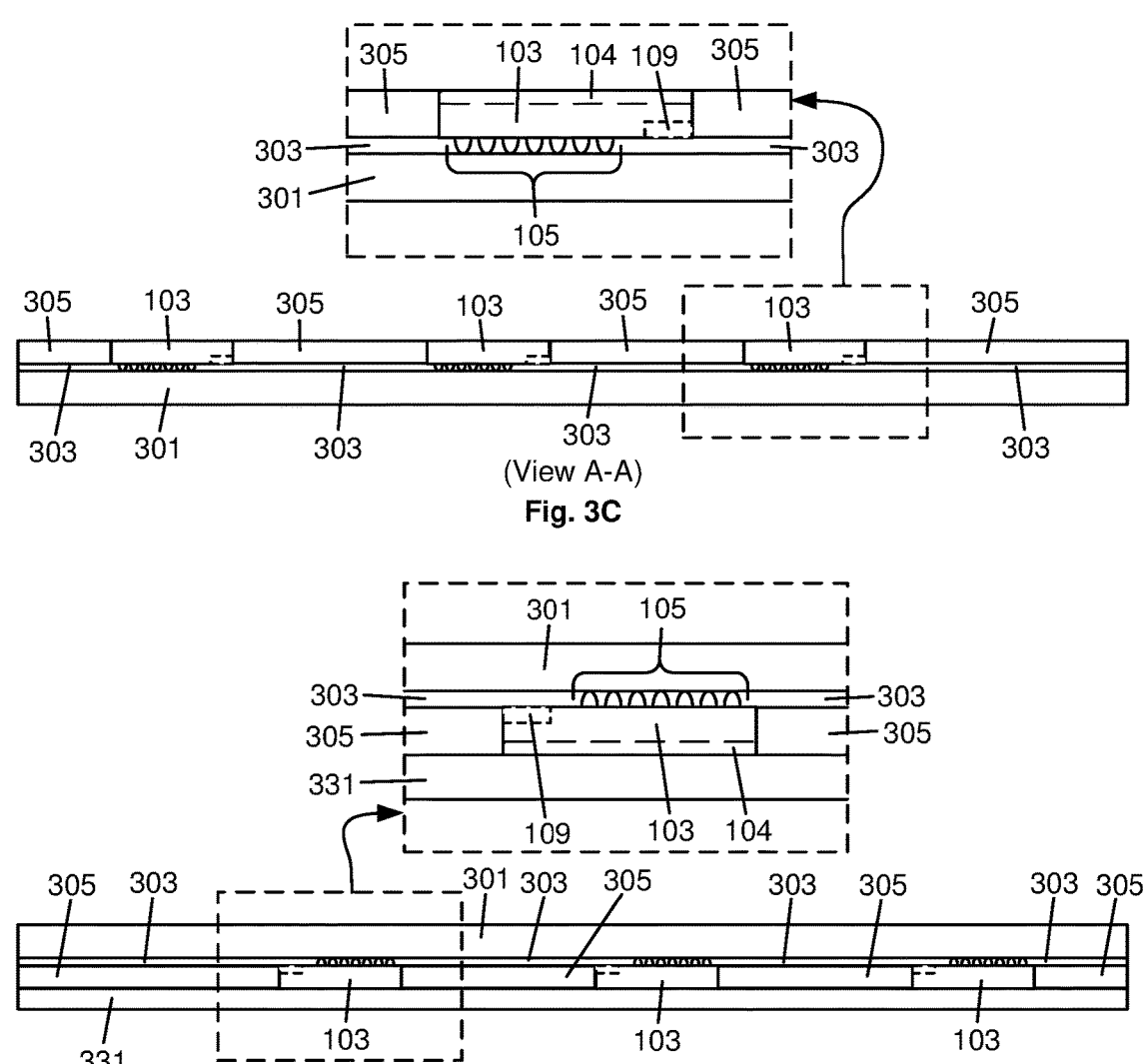
FIG. 3C shows the vertical cross-section view through the carrier wafer as shown in FIG. 3B, with the mold compound disposed above the adhesive layer and between/around the electro-optical chips, in accordance with some embodiments.
FIG. 3D shows a vertical cross-section view through the carrier wafer and the electro-optical chips attached thereto, with the bottom surfaces of the silicon substrates of the electro-optical chips in physical contact with the silicon base wafer, in accordance with some embodiments.
FIG. 3E shows a vertical cross-section view through the silicon base wafer with the silicon substrates of the electro-optical chips fusion bonded to the silicon base wafer, and with the carrier wafer and adhesive layer released from the electro-optical chips, in accordance with some embodiments.

In some embodiments, such as shown in the example of FIG. 3B, the region above the adhesive layer 303 and between/around the electro-optical chips 103 is left vacant, e.g., filled by ambient atmosphere. However, in some embodiments, as an option, the region above the adhesive layer 303 and between/around the electro-optical chips 103 is filled with a mold compound material 305. FIG. 3C shows the vertical cross-section view through the carrier wafer 301 as shown in FIG. 3B, with the mold compound 305 disposed above the adhesive layer 303 and between/around the electro-optical chips 103, in accordance with some embodiments. In some embodiments, the mold compound 305 is a polymer material. In some embodiments, the mold compound 305 is disposed as a coating of a liquid polymer material, with the liquid polymer material thereafter being allowed to cure to form a solid polymer material. In some embodiments, the liquid polymer material is a liquid polymer composite material. For example, in some embodiments, the liquid polymer composite material includes an epoxy matrix with fill (particulate) material dispersed within the epoxy matrix. It should be understood that in various embodiments, the mold compound 305 can be essentially any type of mold compound material used in semiconductor chip manufacturing, so long as the mold compound 305 is thermally, chemically, and mechanically compatible with the silicon fusion bonding process used to fuse the silicon substrate 104 of the electro-optical chip 103 to a silicon base wafer 331.

In some embodiments, after the electro-optical chips 103 are secured to the carrier wafer 301, a planarization process is performed on the bottom surfaces of the electro-optical chips 103 (the silicon substrate 104 surfaces of the electro-optical chips 103) to ensure that the bottom surfaces of the electro-optical chips 103 are substantially coplanar with each other across the carrier wafer 301. In some embodiments, the planarization process is a chemical mechanical polishing (CMP) process. In some embodiments, the planarization process is a plasma etching process. It should be understood that in various embodiments, the planarization process can implement essentially any type of silicon wafer planarization technology. Once the bottom surfaces of the substrates 104 of the electro-optical chips 103 are sufficiently coplanar with each other across the carrier wafer 301, the carrier wafer 301 with the electro-optical chips 103 attached thereto is positioned over the silicon base wafer 331, such that the bottom surface of the silicon substrate 104 of each of the electro-optical chips 103 is in physical contact with the silicon base wafer 331.

FIG. 3D shows a vertical cross-section view through the carrier wafer 301 and the electro-optical chips 103 attached thereto, with the bottom surfaces of the silicon substrates 104 of the electro-optical chips 103 in physical contact with the silicon base wafer 331, in accordance with some embodiments. In some embodiments, the silicon base wafer 331 has a circumferential size and shape that is substantially the same as the carrier wafer 301. Also, FIG. 3D shows an example embodiment in which the mold compound 305 is present between/around the electro-optical chips 103. However, it should be understood that in some embodiments, the mold compound 305 is not present between/around the electro-optical chips 103, such that the region between/around the electro-optical chips 103 is vacant, e.g., filled by ambient atmosphere.

Figure 3F:
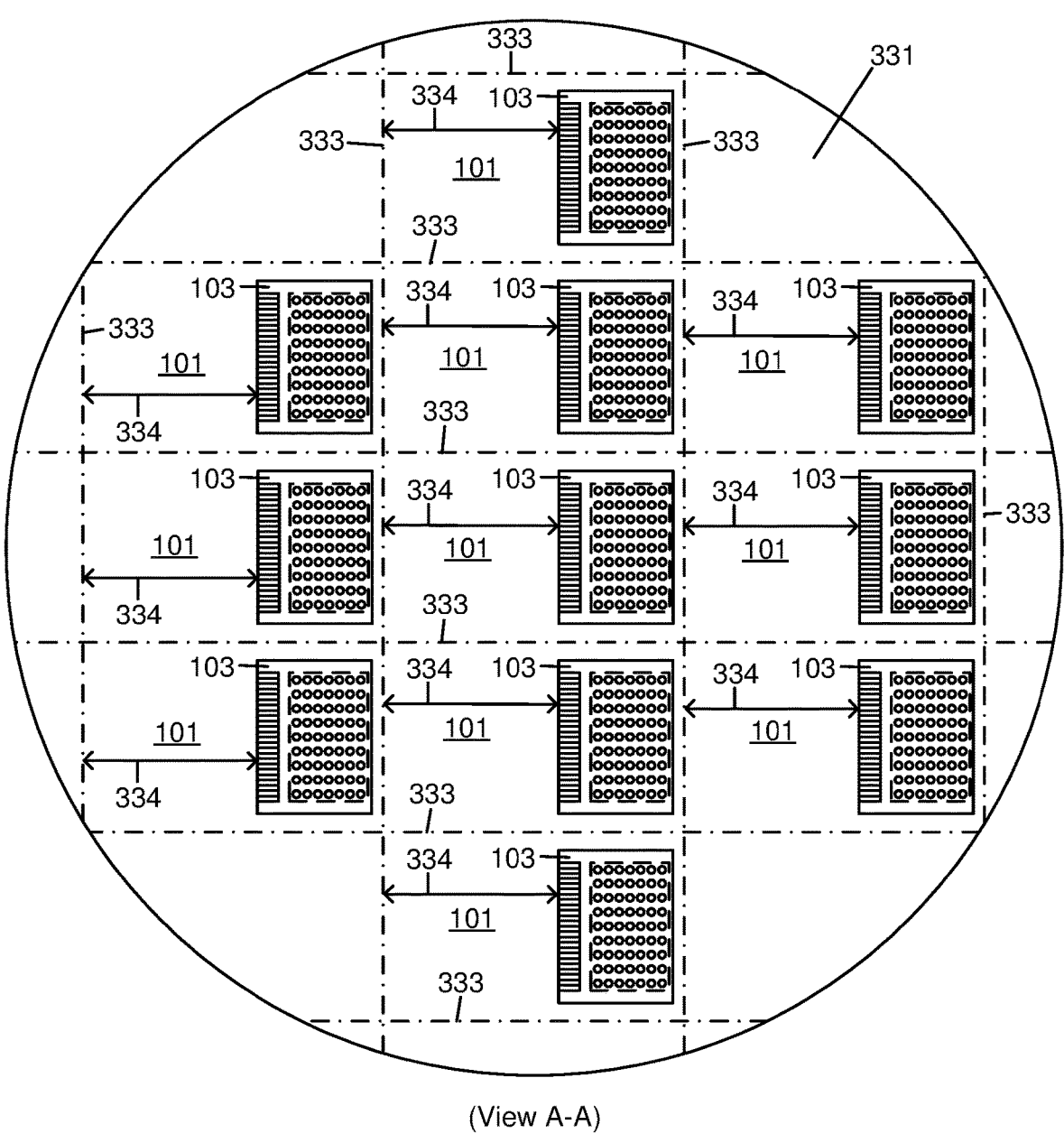
FIG. 3F shows a top view of the silicon base wafer with the silicon substrates of the electro-optical chips fusion bonded to the silicon base wafer, in accordance with some embodiments.

With the silicon substrates 104 of the electro-optical chips 103 in physical contact with the silicon base wafer 331, such as shown in FIG. 3D, a fusion bonding process is performed to fuse the silicon substrates 104 of the electro-optical chips 103 with the silicon base wafer 331. FIG. 3E shows a vertical cross-section view through the silicon base wafer 331 with the silicon substrates 104 of the electro-optical chips 103 fusion bonded to the silicon base wafer 331, and with the carrier wafer 301 and adhesive layer 303 released from the electro-optical chips 103, in accordance with some embodiments. FIG. 3F shows a top view of the silicon base wafer 331 with the silicon substrates 104 of the electro-optical chips 103 fusion bonded to the silicon base wafer 331, in accordance with some embodiments. In various embodiments, the fusion bonding process is performed to form a Si—Si bond at the interface between the silicon substrate 104 of the electro-optical chip 103 and the silicon base wafer 331. In some embodiments, the silicon substrate 104 of the electro-optical chip 103 and the silicon base wafer 331 are sufficiently flat, clean, and polished that the Si—Si bond forms spontaneously upon contact of the silicon substrate 104 of the electro-optical chip 103 with the silicon base wafer 331. In some embodiments, high temperature and high pressure is applied to form the Si—Si bond between the silicon substrate 104 of the electro-optical chip 103 and the silicon base wafer 331. In some embodiments, a high temperature, e.g., >700° C., annealing process is performed to remove water and/or hydrogen gas from the interface region between the silicon substrate 104 of the electro-optical chip 103 and the silicon base wafer 331 in order to strengthen the Si—Si bond. It should be understood that, in various embodiments, essentially any fusion bonding (or direct bonding) process used in the semiconductor fabrication industry for forming Si—Si bonds can be implemented to fusion bond the silicon substrates 104 of the electro-optical chips 103 to the silicon base wafer 331.

As shown in FIG. 3F, a plurality of scribe lines 333 is defined across the silicon base wafer 331, such that a plurality of silicon baseplates 101 for the respective plurality of electro-optical chips 103 is delineated by the plurality of scribe lines 333, where each of the plurality of silicon baseplates 101 corresponds to a different portion of the silicon base wafer 331. In some embodiments, the plurality of scribe lines 333 are defined such that each of the plurality of silicon baseplates 101 has a substantially same shape and a substantially same size. In some embodiments, the plurality of scribe lines 333 are defined such that each of the plurality of silicon baseplates 101 has a substantially rectangular shape that extends outward away from the optical fiber attachment region 109 of its corresponding electro-optical chip 103 by a distance 334 that provides for subsequent attachment of the plurality of optical fibers 107 to the silicon baseplate 101 by way of the adhesive 113.

Figure 3G:
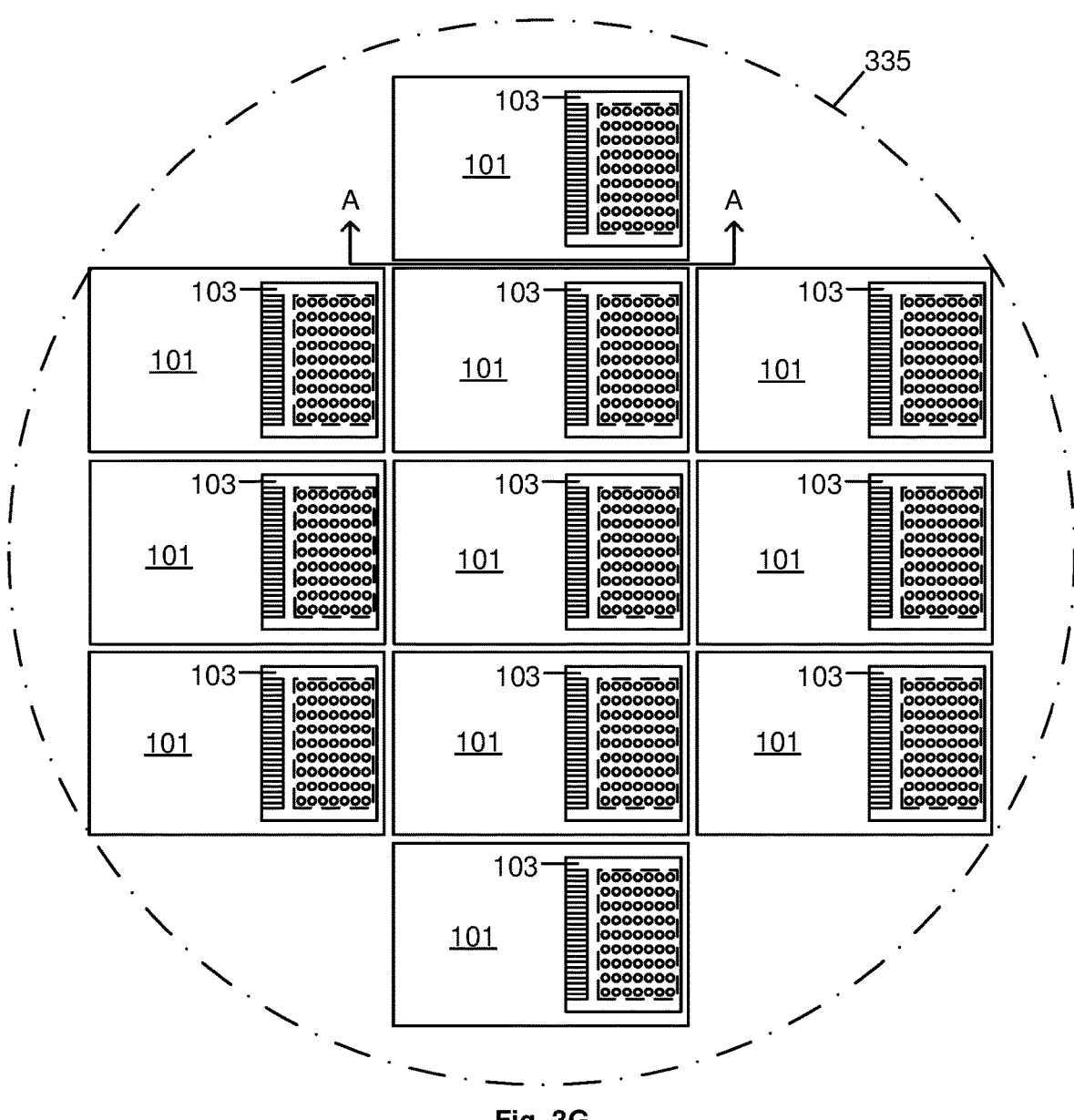
FIG. 3G shows the electro-optical chips and their corresponding silicon baseplates singulated from the silicon base wafer, in accordance with some embodiments.

FIG. 3G shows the electro-optical chips 103 and their corresponding silicon baseplates 101 singulated from the silicon base wafer 331, in accordance with some embodiments. An outline 335 of the silicon base wafer 331 is shown for reference. In various embodiments, the silicon base wafer 331 is cut or divided in some manner along the plurality of scribe lines 333, such as shown in FIG. 3F, to obtain the electro-optical chips 103 and their corresponding silicon baseplates 101. Again, it should be understood that each electro-optical chip 103 is fusion bonded to its corresponding silicon baseplate 101. It should also be understood that each electro-optical chip 103 is manufactured on a semiconductor wafer that is separate from the silicon base wafer 331 from which the silicon baseplates 101 are formed. FIG. 2A shows the side view of the electro-optical chip 103 fusion bonded to its silicon baseplate 101 after singulation from the silicon base wafer 331, which is referenced as View A-A in FIG. 3G.

Figure 3H:
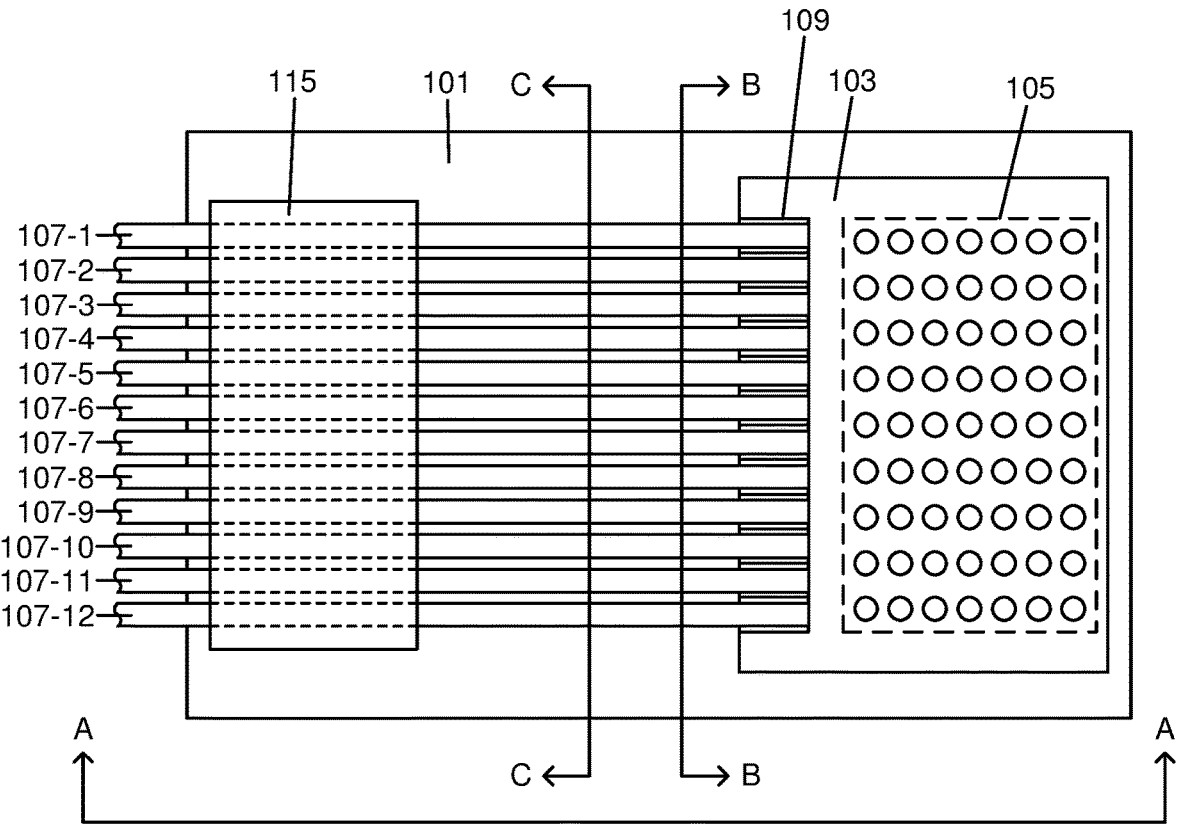
FIG. 3H shows a top view of the plurality of optical fibers attached to the electro-optical chip, in accordance with some embodiments.
Figure 3I:
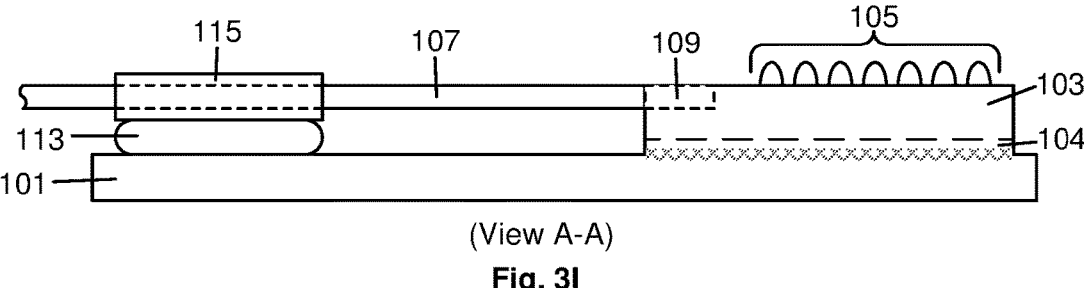
FIG. 3I shows a side view of the plurality of optical fibers attached to the electro-optical chip, referenced as View A-A in FIG. 3H, in accordance with some embodiments.
Figure 3J:
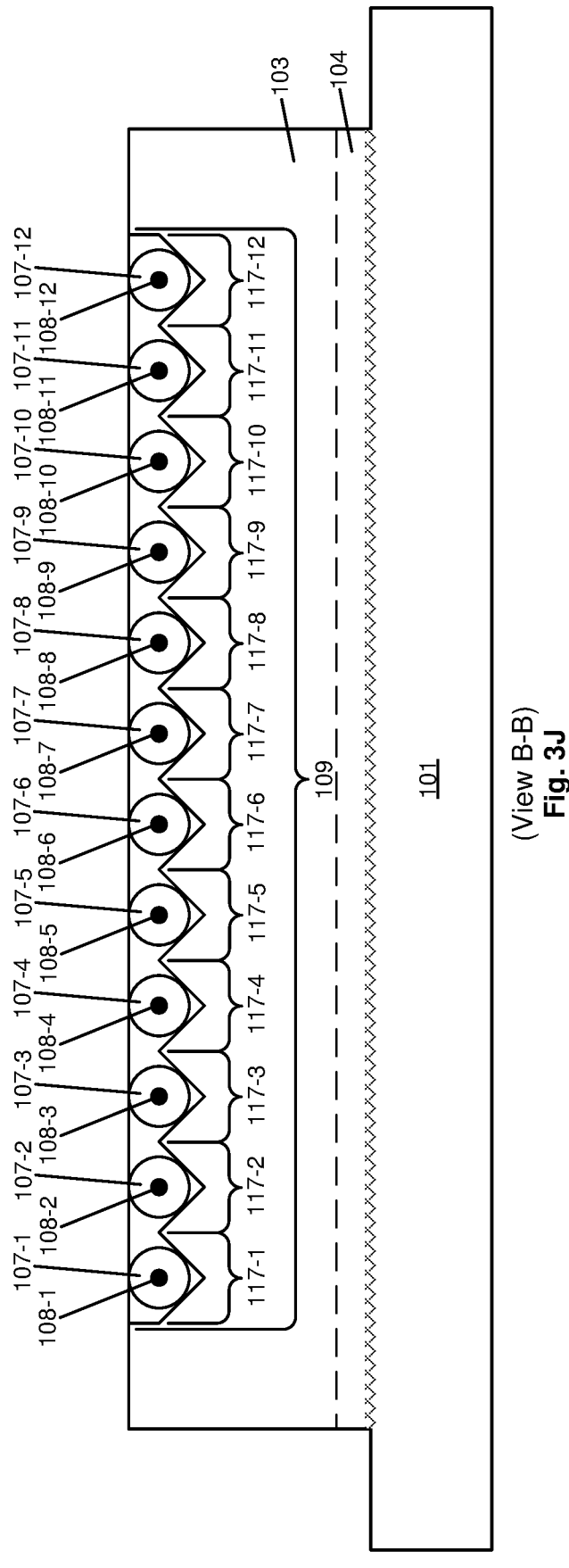
FIG. 3J shows a vertical cross-section view of the plurality of optical fibers attached to the electro-optical chip, looking toward the electro-optical chip, referenced as View B-B in FIG. 3H, in accordance with some embodiments.

After the electro-optical chip 103 and its corresponding silicon baseplate 101 is singulated from the silicon base wafer 331, the plurality of optical fibers 107 is attached to the electro-optical chip 103. FIG. 3H shows a top view of the plurality of optical fibers 107 attached to the electro-optical chip 103, such as previously described with regard to FIG. 1C, in accordance with some embodiments. FIG. 3I shows a side view of the plurality of optical fibers 107 attached to the electro-optical chip 103, referenced as View A-A in FIG. 3H, in accordance with some embodiments. FIG. 3J shows a vertical cross-section view of the plurality of optical fibers 107 attached to the electro-optical chip 103, looking toward the electro-optical chip 103, referenced as View B-B in FIG. 3H, in accordance with some embodiments. FIG. 1D shows the vertical cross-section view of the plurality of optical fibers 107 attached to the electro-optical chip 103, looking toward the support block 115, which is referenced as View C-C in FIG. 3H.

Figure 4:
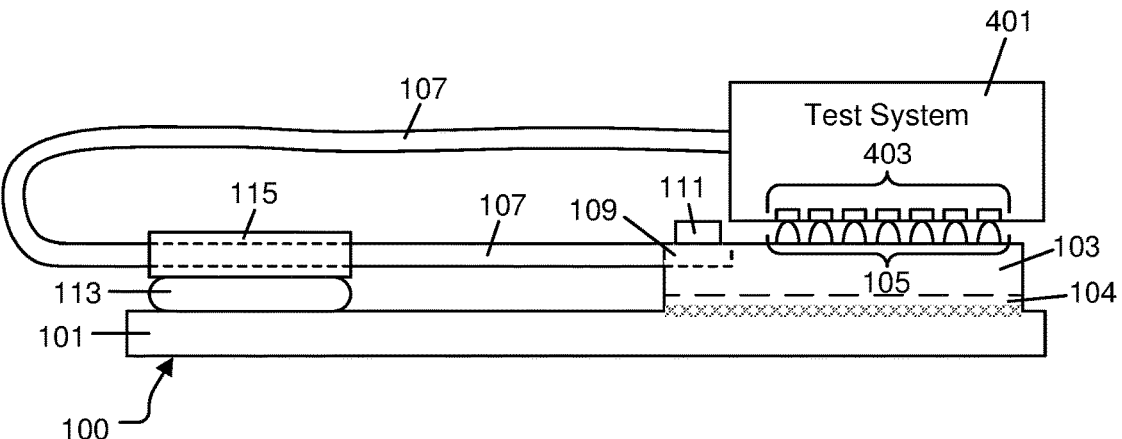
FIG. 4 shows the electro-optical chip assembly connected both photonically and electrically to a test system, in accordance with some embodiments.
Figure 5:
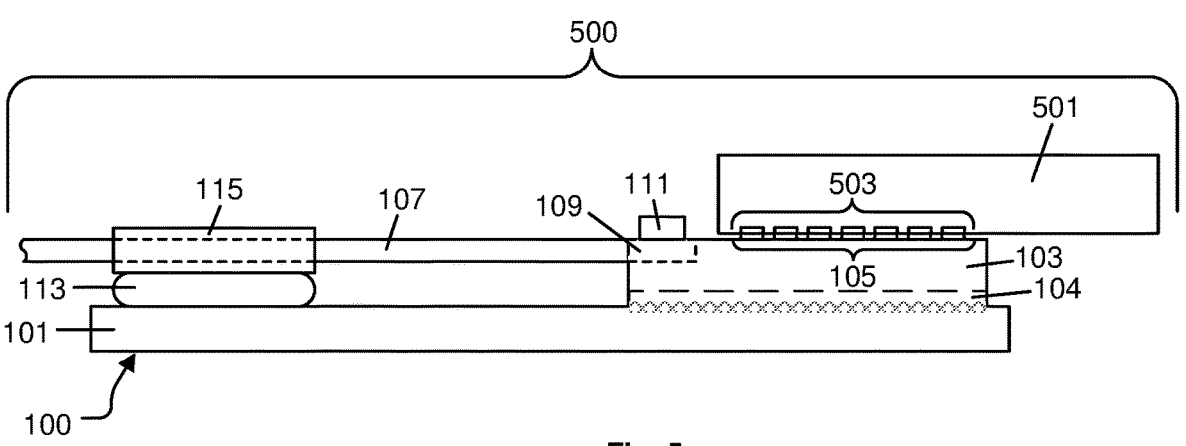
FIG. 5 shows an example of an MCP in which the electro-optical chip of the electro-optical chip assembly is solder bonded to an electronic package, in accordance with some embodiments.

It should be understood that with the plurality of optical fibers 107 attached to the electro-optical chip 103 in the electro-optical chip assembly 100, the electro-optical chip 103 is configured for photonic and electronic testing before the electro-optical chip 103 is solder bonded to an electronic package, e.g., multi-chip package (MCP) and/or to another computer chip and/or to another electronic component. FIG. 4 shows the electro-optical chip assembly 100 connected both photonically and electrically to a test system 401, in accordance with some embodiments. In some embodiments, the test system 401 includes a plurality of electrically conductive contact pads 403 that can be positioned in physical contact with the plurality of solder bumps 105 of the electro-optical chip 103. Also, the plurality of optical fibers 107 can be temporarily optically connected to corresponding optical input/output devices of the test system 403. The test system 403 is configured to use the plurality of optical fibers 107 and the plurality of solder bumps 105 to test the photonic and electronic performance of the electro-optical chip 103. In various embodiments, the test system 403 includes one or more computer systems that can be programmed and operated as needed to test the photonic and electronic performance of the electro-optical chip 103. It should be appreciated that the photonic and electronic testing of the electro-optical chip 103 can be performed with the electro-optical chip assembly 100 in the pre-solder-reflow state, which enables verification of proper functionality of the electro-optical chip 103 before physical bonding of the electro-optical chip 103 to another device. This serves to reduce the loss of MCPs and/or other electronic devices due to their physical connection with a later discovered inoperable electro-optical chip 103. Once the electro-optical chip 103 is tested and verified to function properly, the electro-optical chip 103 is bonded to another electronic package or computer chip or electronic component through a solder reflow process that bonds the plurality of solder bumps 105 to a corresponding plurality of conductive pads on the other electronic package or computer chip or electronic component. FIG. 5 shows an example of an MCP 500 in which the electro-optical chip 103 of the electro-optical chip assembly 100 is solder bonded to an electronic package 501, in accordance with some embodiments. More specifically, the plurality of solder bumps 105 of the electro-optical chip 103 is solder bonded to a corresponding plurality of electrically conductive pads 503 of the electronic package 501.

Figures 6A, 6B:
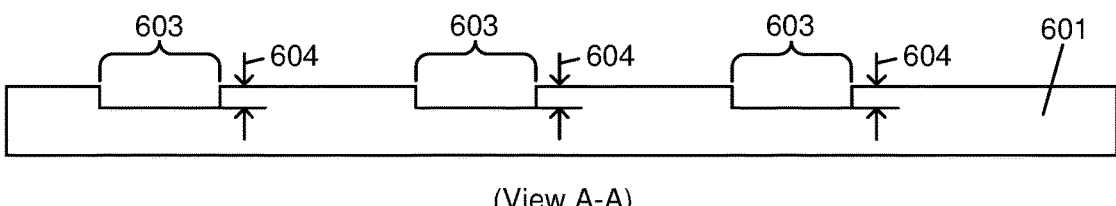
FIG. 6A shows a top view of a carrier wafer that includes a number of sockets, in accordance with some embodiments.
FIG. 6B shows a vertical cross-section view through the carrier wafer, referenced as View A-A in FIG. 6A, in accordance with some embodiments.

In some embodiments, the process for manufacturing the electro-optical chip assembly 100 is performed without disposal of the adhesive layer 303 on the carrier wafer 301. For example, FIG. 6A shows a top view of a carrier wafer 601 that includes a number of sockets 603, in accordance with some embodiments. FIG. 6B shows a vertical cross-section view through the carrier wafer 601, referenced as View A-A in FIG. 6A, in accordance with some embodiments. Each of the sockets 603 is formed as a recessed region that extends a prescribed depth 604 into the carrier wafer 601 from the top surface of the carrier wafer 601. In some embodiments, each of the sockets 603 is formed to have an outer peripheral shape that substantially matches an outer peripheral shape of the electro-optical chip 103. Also, in some embodiments, each of the sockets 603 is formed to have a horizontal cross-section size that substantially matches a horizontal cross-section size of the electro-optical chip 103, such that when the electro-optical chip 103 is disposed within the socket 603, the electro-optical chip 103 is held by friction force within the socket 603, without use of an adhesive material to hold the electro-optical chip 103 on the carrier wafer 601. However, in other embodiments, a temporary adhesive is used to secure each electro-optical chip 103 within its respective socket 603.

Figures 6C, 6D:
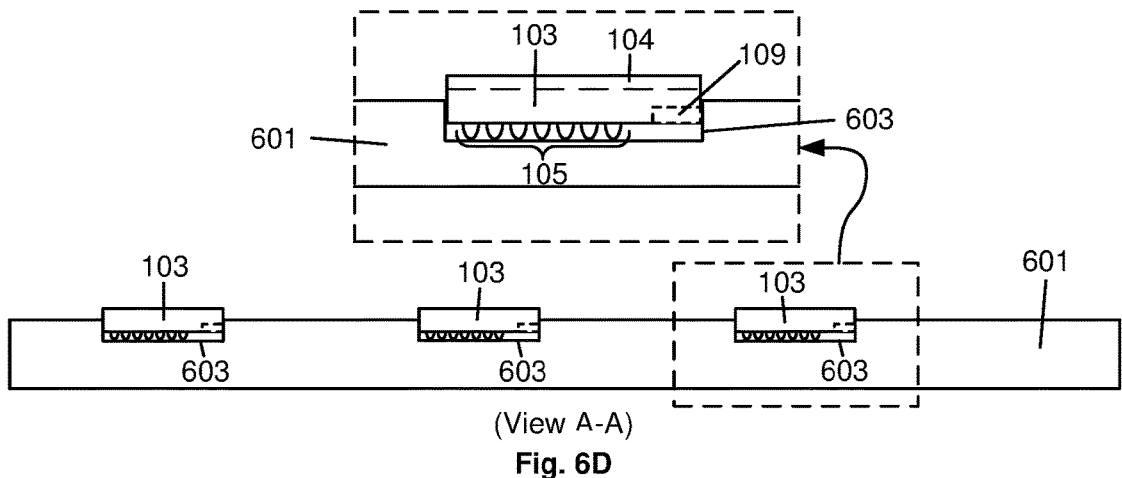
FIG. 6C shows a top view of the carrier wafer with the electro-optical chips respectively disposed within the sockets, in accordance with some embodiments.
FIG. 6D shows a vertical cross-section view through the carrier wafer with the electro-optical chips disposed within the sockets, referenced as View A-A in FIG. 6C, in accordance with some embodiments.

FIG. 6C shows a top view of the carrier wafer 601 with the electro-optical chips 103 respectively disposed within the sockets 603, in accordance with some embodiments. Each socket 603 is positioned on the carrier wafer 601 so that when the electro-optical chip 103 is disposed within the socket 603 an open region is present next to the optical fiber attachment region 109 of the electro-optical chip 103, where the open region corresponds to an area in which the silicon baseplate 101 corresponding to the electro-optical chip 103 is to be formed to create the electro-optical chip assembly 100.

FIG. 6D shows a vertical cross-section view through the carrier wafer 601 with the electro-optical chips 103 disposed within the sockets 603, referenced as View A-A in FIG. 6C, in accordance with some embodiments. In some embodiments, the electro-optical chips 103 are fully seated within the sockets 603, such that the plurality of solder bumps 105 of the electro-optical chips 103 contact the carrier wafer 601 at the bottom of the sockets 603.

Figures 6E, 7A:
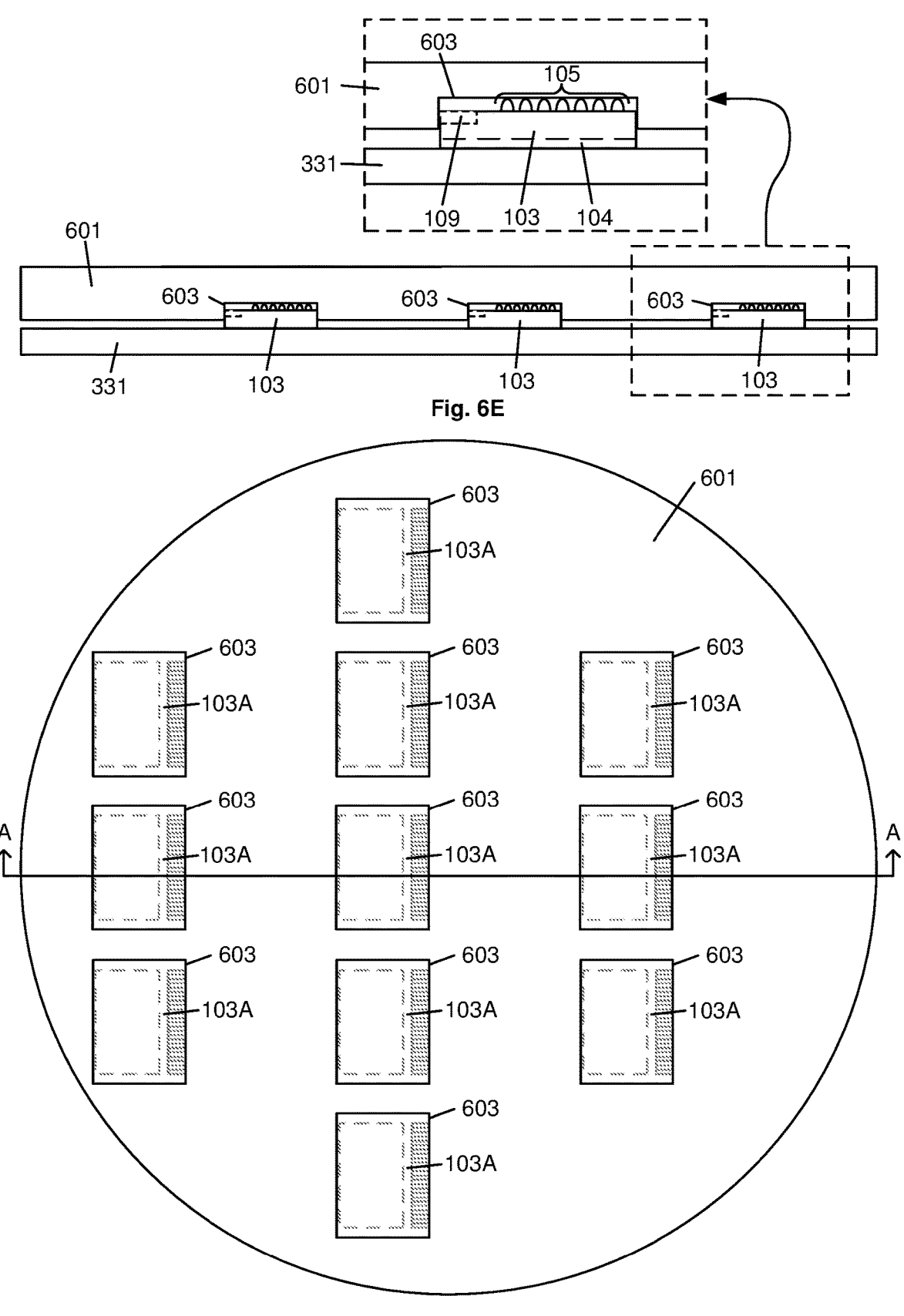
FIG. 6E shows a vertical cross-section view through the carrier wafer and the electro-optical chips attached thereto, with the bottom surfaces of the silicon substrates of the electro-optical chips in physical contact with the silicon base wafer, in accordance with some embodiments.
FIG. 7A shows a top view of the carrier wafer with electro-optical chips disposed within the sockets, in accordance with some embodiments.

In some embodiments, after the electro-optical chips 103 are secured within the sockets 603 of the carrier wafer 601, a planarization process is performed on the bottom surfaces of the silicon substrates 104 of the electro-optical chips 103 to ensure that bottom surfaces of the silicon substrates 104 of the electro-optical chips 103 are substantially coplanar with each other across the carrier wafer 601. In some embodiments, the planarization process includes one or more of a CMP process, a plasma etching process, and/or another type of planarization process used in semiconductor wafer manufacturing. Once the bottom surfaces of the silicon substrates 104 of the electro-optical chips 103 are sufficiently coplanar with each other across the carrier wafer 601, the carrier wafer 601 with the electro-optical chips 103 secured in their respective sockets 603 is positioned over the silicon base wafer 331, such that the bottom surfaces of the silicon substrates 104 of the electro-optical chips 103 are in physical contact with the silicon base wafer 331. FIG. 6E shows a vertical cross-section view through the carrier wafer 601 and the electro-optical chips 103 attached thereto, with the bottom surfaces of the silicon substrates 104 of the electro-optical chips 103 in physical contact with the silicon base wafer 331, in accordance with some embodiments. In some embodiments, the silicon base wafer 331 has a circumferential size and shape that is substantially the same as the carrier wafer 601.

With the silicon substrates of the electro-optical chips 103 in physical contact with the silicon base wafer 331, such as shown in FIG. 6E, the fusion bonding process is performed to fuse the silicon substrates of the electro-optical chips 103 with the silicon base wafer 331. FIG. 3E shows a vertical cross-section view through the silicon base wafer 331 with the electro-optical chips 103 fusion bonded to the silicon base wafer 331 and with the carrier wafer 601 released from the electro-optical chips 103, in accordance with some embodiments. From the configuration of FIG. 3E, the process for manufacturing the electro-optical chip assembly 100 proceeds with the singulation of the silicon base wafer 331, as previously discussed with regard to FIGS. 3F and 3G, and with the attachment of the plurality of optical fibers 107 to the electro-optical chip 103, as previously discussed with regard to FIGS. 3H, 3I, and 3J.

In some embodiments, the electro-optical chips 103 are fusion bonded to the silicon base wafer 331 before the plurality of solder bumps 105 are disposed on the electro-optical chips 103. FIG. 7A shows a top view of the carrier wafer 601 with electro-optical chips 103A disposed within the sockets 603, in accordance with some embodiments. The plurality of solder bumps 105 is not yet disposed on each of the electro-optical chips 103A in the configuration of FIG. 7A. The electro-optical chips 103A are oriented such that the surface of each electro-optical chip 103A on which the plurality of solder bumps 105 is to be disposed faces toward the carrier wafer 601.

Figure 7B:
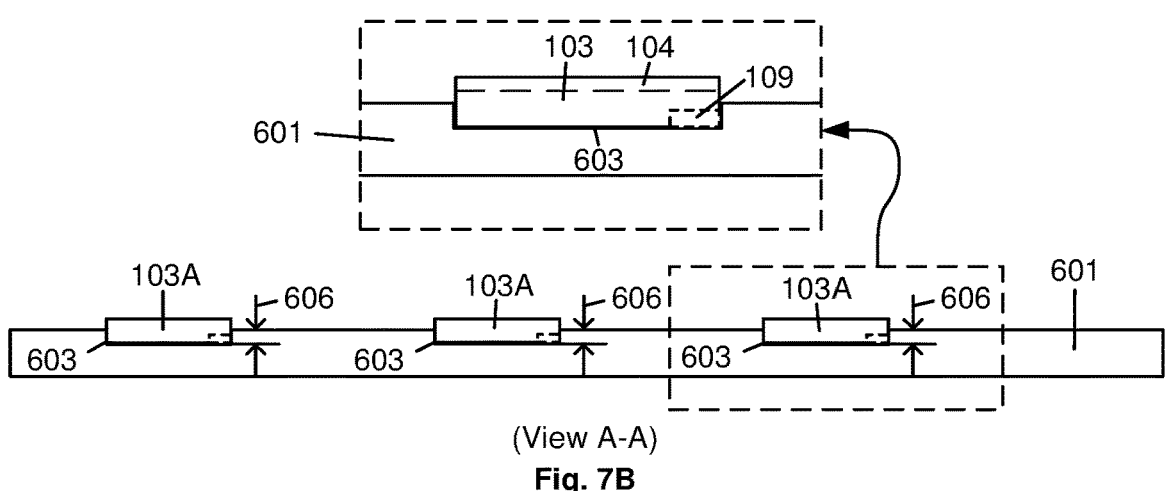
FIG. 7B shows a vertical cross-section view through the carrier wafer with the electro-optical chips disposed within the sockets, referenced as View A-A in FIG. 7A, in accordance with some embodiments.

FIG. 7B shows a vertical cross-section view through the carrier wafer 601 with the electro-optical chips 103A disposed within the sockets 603, referenced as View A-A in FIG. 7A, in accordance with some embodiments. Each of the sockets 603 is formed as a recessed region that extends a prescribed depth 606 into the carrier wafer 601 from the top surface of the carrier wafer 601. In some embodiments, the electro-optical chips 103A are fully seated within the sockets 603, such that the top surface of the electro-optical chips 103A on which the plurality of solder bumps 105 are to be disposed contact the carrier wafer 601 at the bottom of the sockets 603.

Figure 7C:
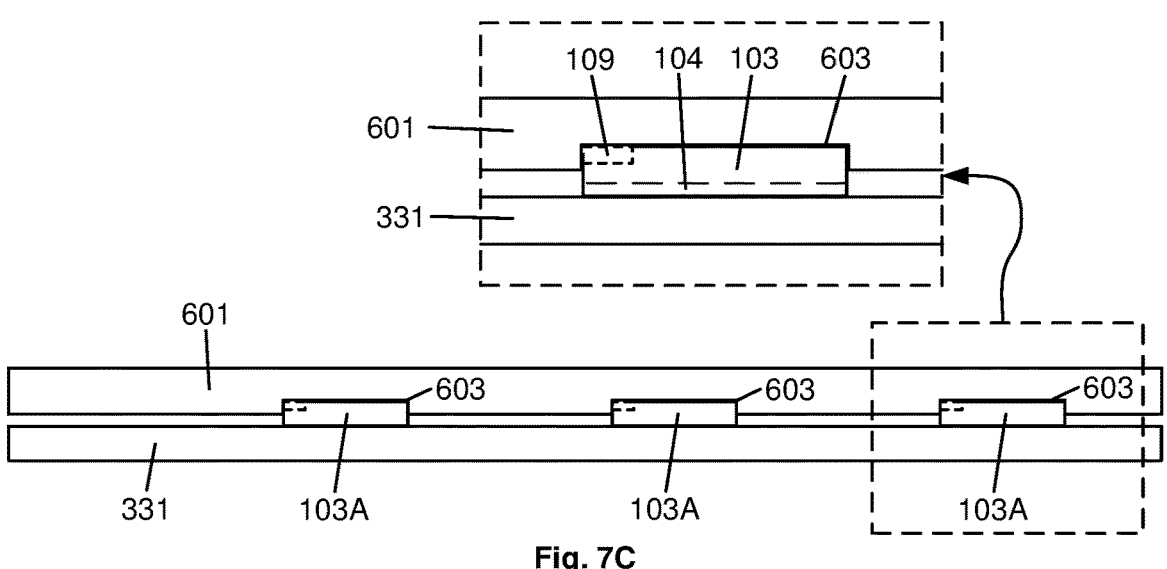
FIG. 7C shows a vertical cross-section view through the carrier wafer and the electro-optical chips attached thereto, with the bottom surfaces of the silicon substrates of the electro-optical chips in physical contact with the silicon base wafer, in accordance with some embodiments.

In some embodiments, after the electro-optical chips 103A are secured within the sockets 603 of the carrier wafer 601, a planarization process is performed on the bottom surfaces of the silicon substrates 104 of the electro-optical chips 103A to ensure that bottom surfaces of the silicon substrates 104 of the electro-optical chips 103A are substantially coplanar with each other across the carrier wafer 601. In some embodiments, the planarization process includes one or more of a CMP process, a plasma etching process, and/or another type of planarization process used in semiconductor wafer manufacturing. Once the bottom surfaces of the silicon substrates 104 of the electro-optical chips 103A are sufficiently coplanar with each other across the carrier wafer 601, the carrier wafer 601 with the electro-optical chips 103A secured in their respective sockets 603 is positioned over the silicon base wafer 331, such that the bottom surfaces of the silicon substrates 104 of the electro-optical chips 103A are in physical contact with the silicon base wafer 331. FIG. 7C shows a vertical cross-section view through the carrier wafer 601 and the electro-optical chips 103A attached thereto, with the bottom surfaces of the silicon substrates 104 of the electro-optical chips 103A in physical contact with the silicon base wafer 331, in accordance with some embodiments.

Figure 7D:
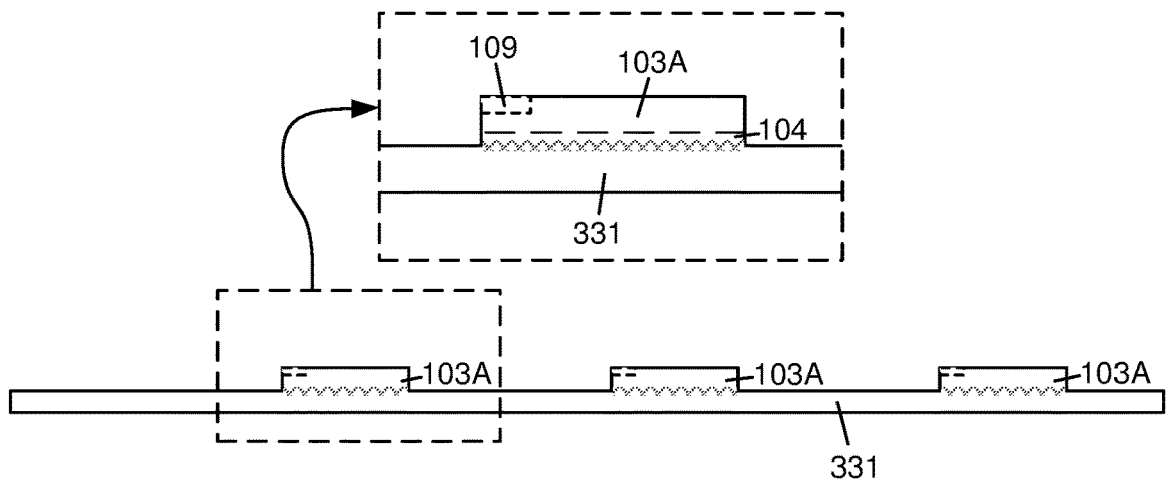
FIG. 7D shows a vertical cross-section view through the silicon base wafer with the silicon substrates of the electro-optical chips fusion bonded to the silicon base wafer, and with the carrier wafer released from the electro-optical chips 103A, in accordance with some embodiments.

With the silicon substrates 104 of the electro-optical chips 103A in physical contact with the silicon base wafer 331, such as shown in FIG. 7C, the fusion bonding process is performed to fuse the silicon substrates 104 of the electro-optical chips 103A with the silicon base wafer 331. FIG. 7D shows a vertical cross-section view through the silicon base wafer 331 with the silicon substrates 104 of the electro-optical chips 103A fusion bonded to the silicon base wafer 331, and with the carrier wafer 601 released from the electro-optical chips 103A, in accordance with some embodiments. From the configuration of FIG. 7D, the process for manufacturing the electro-optical chip assembly 100 proceeds with disposal of the plurality of solder bumps 105 on each of the electro-optical chips 103A. FIG. 7E shows a vertical cross-section view through the silicon base wafer 331 with the plurality of solder bumps 105 disposed on each of the electro-optical chips 103A, in accordance with some embodiments. From the configuration of FIG. 7E, the process for manufacturing the electro-optical chip assembly 100 proceeds with the singulation of the silicon base wafer 331, as previously discussed with regard to FIGS. 3F and 3G, and with the attachment of the plurality of optical fibers 107 to the electro-optical chip 103, as previously discussed with regard to FIGS. 3H, 3I, and 3J.

FIG. 8A shows a flowchart of a method for manufacturing the electro-optical chip assembly 100, in accordance with some embodiments. The method includes an operation 801 for attaching the electro-optical chip 103/103A to the carrier wafer 301/601, such that the silicon substrate 104 of the electro-optical chip 103/103A faces away from the carrier wafer 301/601. In some embodiments, the method includes disposing the adhesive layer 303 on the carrier wafer 301, where the adhesive layer 303 is configured to temporarily attach the electro-optical chip 103/103A to the carrier wafer 301. In some embodiments, the carrier wafer 601 includes a socket 603 configured to receive the electro-optical chip 103/103A, where attaching the electro-optical chip 103/103A to the carrier wafer 601 includes disposing the electro-optical chip 103/103A within the socket 603. In some embodiments, the electro-optical chip 103/103A is attached to the carrier wafer 301/601 such that the plurality of solder bumps 105 of the electro-optical chip 103/103A faces toward the carrier wafer 301/601.

The method also includes an operation 803 for positioning the carrier wafer 301/601 over the silicon base wafer 331, such that the silicon substrate 104 of the electro-optical chip 103/103A faces toward the silicon base wafer 331. The method also includes an operation 805 for applying a force to the carrier wafer 301/601 to press the silicon substrate 104 of the electro-optical chip 103/103A against the silicon base wafer 331. The method also includes an operation 807 for fusion bonding the silicon substrate 104 of the electro-optical chip 103/103A with the silicon base wafer 331. The method also includes an operation 809 for releasing the carrier wafer 301/601 from the electro-optical chip 103/103A.

In some embodiments, the method includes disposing the mold compound 305 around the electro-optical chip 103/103A after the electro-optical chip 103/103A is attached to the carrier wafer 301/601 and before the carrier wafer 301/601 is positioned over the silicon base wafer 331. In these embodiments, the method includes removing the mold compound 305 from around the electro-optical chip 103/103A as part of releasing the carrier wafer 301/601 from the electro-optical chip 103/103A. In some embodiments, the method includes disposing the plurality of solder bumps 105 on the electro-optical chip 103/103A after the carrier wafer 301/601 is released from the electro-optical chip 103/103A.

FIG. 8B shows a flowchart of a continuation of the method for manufacturing the electro-optical chip assembly 100 as shown in the flowchart of FIG. 8A, in accordance with some embodiments. The method includes an operation 811 for singulating the silicon base wafer 331 after fusion bonding of the silicon substrate 104 of the electro-optical chip 103/103A with the silicon base wafer 331, and after releasing the carrier wafer 301/601 from the electro-optical chip 103/103A. The silicon base wafer 331 is singulated such that a portion of the silicon base wafer 331 bonded to the electro-optical chip 103/103A forms the silicon baseplate 101 for the electro-optical chip 103/103A, and such that the silicon baseplate 101 includes a region for attachment of the plurality of optical fibers 107 to the silicon baseplate 101 by way of the adhesive 113.

The method also includes an operation 813 for attaching the plurality of optical fibers 107 to the electro-optical chip 103/103A to provide for optical communication between the plurality of optical fibers 107 and the electro-optical chip 103/103A. The method also includes an operation 815 for securing the plurality of optical fibers 107 to the silicon baseplate 101 to which the substrate of the electro-optical chip 103/103A is fusion bonded before performing a solder reflow process to attach the electro-optical chip 103/103A to an electronic package.

FIG. 8C shows a flowchart of a continuation of the method for manufacturing the electro-optical chip assembly 100 as shown in the flowchart of FIG. 8B, in accordance with some embodiments. The method includes an operation 817 for performing photonic and electrical testing of the electro-optical chip 103/103A after attaching the plurality of optical fibers 107 to the electro-optical chip 103/103A and before performing the solder reflow process to attach the electro-optical chip 103/103A to the electronic package. The method then proceeds with an operation 819 for performing the solder reflow process to attach the electro-optical chip 103/103A to the electronic package.

The foregoing description of the embodiments has been provided for purposes of illustration and description, and is not intended to be exhaustive or limiting. Individual elements or features of a particular embodiment are generally not limited to that particular embodiment, but, where applicable, are interchangeable and can be used in a selected embodiment, even if not specifically shown or described. In this manner, one or more features from one or more embodiments disclosed herein can be combined with one or more features from one or more other embodiments disclosed herein to form another embodiment that is not explicitly disclosed herein, but rather that is implicitly disclosed herein. This other embodiment may also be varied in many ways. Such embodiment variations are not to be regarded as a departure from the disclosure herein, and all such embodiment variations and modifications are intended to be included within the scope of the disclosure provided herein.

Although some method operations may be described in a specific order herein, it should be understood that other operations may be performed in between method operations, and/or method operations may be adjusted so that they occur at slightly different times or simultaneously or may be distributed in a system which allows the occurrence of the processing operations at various intervals associated with the processing, as long as the processing of the method operations are performed in a manner that provides for successful implementation of the method.

Although the foregoing embodiments have been described in some detail for purposes of clarity of understanding, it will be apparent that certain changes and modifications can be practiced within the scope of the appended claims. Accordingly, the embodiments disclosed herein are to be considered as illustrative and not restrictive, and are therefore not to be limited to just the details given herein, but may be modified within the scope and equivalents of the appended claims.

What is claimed is:

1. An electro-optical chip assembly, comprising:
a silicon baseplate;
an electro-optical chip having a silicon substrate, the silicon substrate of the electro-optical chip fusion bonded to the silicon baseplate, wherein the electro-optical chip is manufactured separate from the silicon baseplate before fusion bonding of the silicon substrate of the electro-optical chip to the silicon baseplate, wherein a ball grid array is disposed on a surface of the electro-optical chip that faces away from the silicon baseplate, wherein the electro-optical chip is in a presolder-reflow state such that solder balls of the ball grid array have not yet been reflowed; and
a plurality of optical fibers attached to the electro-optical chip.

2. The electro-optical chip assembly as recited in claim 1, further comprising:
a cover plate disposed to secure the plurality of optical fibers to the electro-optical chip.

3. The electro-optical chip assembly as recited in claim 1, wherein the plurality of optical fibers is secured to the silicon baseplate.

4. The electro-optical chip assembly as recited in claim 3, further comprising:
an adhesive disposed to secure the plurality of optical fibers to the silicon baseplate.

5. The electro-optical chip assembly as recited in claim 1, further comprising:
a test system including a plurality of electrically conductive contact pads positioned in physical contact with solder balls of the ball grid array, the test system including optical input/output devices optically connected to the plurality of optical fibers.

6. The electro-optical chip assembly as recited in claim 5, wherein the test system is configured to use the plurality of optical fibers and the ball grid array for testing of photonic and electronic performance of the electro-optical chip.

7. An electro-optical chip wafer assembly, comprising:
a silicon base wafer; and
a plurality of electro-optical chips distributed across the silicon base wafer, each of the plurality of electro-optical chips having a silicon substrate fusion bonded to the silicon base wafer, wherein each of the plurality of electro-optical chips is manufactured on a semiconductor wafer that is separate from the silicon base wafer.

8. The electro-optical chip wafer assembly as recited in claim 7, further comprising:
a plurality of scribe lines defined across the silicon base wafer such that a plurality of silicon baseplates for the respective plurality of electro-optical chips is delineated by the plurality of scribe lines, wherein each of the plurality of silicon baseplates corresponds to a different portion of the silicon base wafer.

9. The electro-optical chip wafer assembly as recited in claim 8, wherein each of the plurality of silicon baseplates has a substantially same shape and a substantially same size.

10. The electro-optical chip wafer assembly as recited in claim 9, wherein the substantially same shape is a substantially rectangular shape.

11. The electro-optical chip wafer assembly as recited in claim 10, wherein each of the plurality of electro-optical chips has a side along which an optical fiber attachment region is formed, wherein each of the plurality of electro-optical chips is positioned on its respective silicon baseplate such that its respective silicon baseplate extends away from the side of the electro-optical chip along which the optical fiber attachment region is formed by a distance that provides for attachment of a plurality of optical fibers to its respective silicon baseplate.

12. The electro-optical chip wafer assembly as recited in claim 7, wherein each of the plurality of electro-optical chips has a respective plurality of solder bumps exposed on a surface of the electro-optical chip that faces away from the silicon base wafer.

13. A method for manufacturing an electro-optical chip assembly, comprising:

attaching an electro-optical chip to a carrier wafer such that a silicon substrate of the electro-optical chip faces away from the carrier wafer;

positioning the carrier wafer over a silicon base wafer such that the silicon substrate of the electro-optical chip faces toward the silicon base wafer;

applying a force to the carrier wafer to press the silicon substrate of the electro-optical chip against the silicon base wafer;

fusion bonding the silicon substrate of the electro-optical chip with the silicon base wafer; and releasing the carrier wafer from the electro-optical chip.

14. The method as recited in claim 13, further comprising:

disposing an adhesive layer on the carrier wafer, the adhesive layer configured to attach the electro-optical chip to the carrier wafer.

15. The method as recited in claim 13, wherein the carrier wafer includes a socket configured to receive the electro-optical chip, wherein attaching the electro-optical chip to the carrier wafer includes disposing the electro-optical chip within the socket.

16. The method as recited in claim 13, further comprising:

disposing a mold compound around the electro-optical chip after the electro-optical chip is attached to the carrier wafer and before the carrier wafer is positioned over the silicon base wafer; and removing the mold compound from around the electro-optical chip as part of releasing the carrier wafer from the electro-optical chip.

17. The method as recited in claim 13, wherein the electro-optical chip is attached to the carrier wafer such that a plurality of solder bumps of the electro-optical chip faces toward the carrier wafer.

18. The method as recited in claim 13, further comprising:

disposing a plurality of solder bumps on the electro-optical chip after the carrier wafer is released from the electro-optical chip.

19. The method as recited in claim 13, further comprising:

singulating the silicon base wafer after fusion bonding of the silicon substrate of the electro-optical chip with the silicon base wafer and after releasing the carrier wafer from the electro-optical chip, wherein the silicon base wafer is singulated such that a portion of the silicon base wafer bonded to the electro-optical chip forms a silicon baseplate for the electro-optical chip, and such that the silicon baseplate includes a region for attachment of a plurality of optical fibers to the silicon baseplate.

20. The method as recited in claim 19, further comprising:

attaching a plurality of optical fibers to the electro-optical chip to provide for optical communication between the plurality of optical fibers and the electro-optical chip; and securing the plurality of optical fibers to the silicon baseplate to which the substrate of the electro-optical chip is fusion bonded before performing a solder reflow process to attach the electro-optical chip to an electronic package.

21. The method as recited in claim 20, further comprising:

performing photonic and electrical testing of the electro-optical chip after attaching the plurality of optical fibers to the electro-optical chip and before performing the solder reflow process to attach the electro-optical chip to the electronic package.

22. The method as recited in claim 21, further comprising:

performing the solder reflow process to attach the electro-optical chip to the electronic package.

\* \* \* \* \*